United States Patent
Cho et al.

(10) Patent No.: US 9,639,175 B2
(45) Date of Patent: May 2, 2017

(54) DISPLAY DEVICE EXECUTING BENDING OPERATION AND METHOD OF CONTROLLING THEREFOR

(71) Applicant: LG ELECTRONICS INC., Seoul (KR)

(72) Inventors: Eunhyung Cho, Seoul (KR); Doyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 161 days.

(21) Appl. No.: 14/470,313

(22) Filed: Aug. 27, 2014

(65) Prior Publication Data

US 2015/0355728 A1 Dec. 10, 2015

(30) Foreign Application Priority Data

Jun. 9, 2014 (KR) .................. 10-2014-0069268

(51) Int. Cl.
*G06F 3/041* (2006.01)
*G06F 3/03* (2006.01)
*G06F 3/0488* (2013.01)
*G06F 1/16* (2006.01)
*G06F 3/0484* (2013.01)
(Continued)

(52) U.S. Cl.
CPC ............ *G06F 3/03* (2013.01); *G06F 1/1643* (2013.01); *G06F 1/1652* (2013.01); *G06F 1/1694* (2013.01); *G06F 3/017* (2013.01); *G06F 3/0416* (2013.01); *G06F 3/0483* (2013.01); *G06F 3/0484* (2013.01); *G06F 3/04845* (2013.01); *G06F 3/04883* (2013.01); *G06F 3/04886* (2013.01); *G06F 2203/04102* (2013.01); *G06F 2203/04803* (2013.01)

(58) Field of Classification Search
CPC ....................................... G06F 3/03
See application file for complete search history.

(56) References Cited

U.S. PATENT DOCUMENTS

| 7,109,967 B2 | 9/2006 | Hioki et al. |
| 7,443,380 B2 | 10/2008 | Nozawa |
| 7,880,718 B2 | 2/2011 | Cradick et al. |

(Continued)

FOREIGN PATENT DOCUMENTS

| KR | 10-1240724 B1 | 3/2013 |
| KR | 10-2013-0068071 A | 6/2013 |
| KR | 10-2013-0127842 A | 11/2013 |

*Primary Examiner* — Jason Olson
(74) *Attorney, Agent, or Firm* — Birch, Stewart, Kolasch & Birch, LLP

(57) ABSTRACT

The present specification relates to a display device executing a bending operation and a method of controlling therefor. A method of controlling a display device, comprising the steps of detecting a first bending input, which is detected when a flexible display unit is bending to a first direction on the basis of a first axis, executing a first operation based on the first bending input, detecting a second bending input while a state that the flexible display unit is not bent is maintained, and executing the first operation based on the second bending input, wherein the second bending input is detected by a combination of a first control input and a second control input, wherein the first control input corresponds to the first axis and the second control input corresponds to the first direction.

18 Claims, 21 Drawing Sheets

(51) Int. Cl.
  *G06F 3/01*     (2006.01)
  *G06F 3/0483*   (2013.01)

(56)         References Cited

U.S. PATENT DOCUMENTS

| | | | |
|---|---|---|---|
| 8,587,539 | B2 | 11/2013 | Tziortzis et al. |
| 2004/0008191 | A1 | 1/2004 | Poupyrev et al. |
| 2008/0303782 | A1 | 12/2008 | Grant et al. |
| 2009/0219247 | A1 | 9/2009 | Watanabe et al. |
| 2010/0011291 | A1 | 1/2010 | Nurmi |
| 2010/0117975 | A1 | 5/2010 | Cho |
| 2010/0141605 | A1 | 6/2010 | Kang et al. |
| 2011/0057873 | A1 | 3/2011 | Geissler et al. |
| 2012/0112994 | A1 | 5/2012 | Vertegaal et al. |
| 2012/0169609 | A1 | 7/2012 | Britton |
| 2013/0044240 | A1 | 2/2013 | Leskela et al. |
| 2013/0127606 | A1 | 5/2013 | Chang |
| 2013/0135182 | A1 | 5/2013 | Jung et al. |
| 2013/0145311 | A1 | 6/2013 | Joo |
| 2013/0154971 | A1 | 6/2013 | Kang et al. |
| 2013/0201115 | A1 | 8/2013 | Heubel |
| 2013/0222207 | A1 | 8/2013 | Baek |
| 2013/0229324 | A1 | 9/2013 | Zhang et al. |
| 2013/0307816 | A1 | 11/2013 | Lee et al. |
| 2014/0002402 | A1 | 1/2014 | Kang et al. |
| 2014/0015743 | A1 | 1/2014 | Seo et al. |
| 2014/0035869 | A1 | 2/2014 | Yun et al. |
| 2014/0062976 | A1* | 3/2014 | Park .................. G09G 5/00 345/204 |
| 2014/0068473 | A1 | 3/2014 | Jano et al. |
| 2014/0281964 | A1* | 9/2014 | Han .................... G06F 3/016 715/708 |
| 2015/0033193 | A1* | 1/2015 | Beaurepaire ........ G06F 3/04845 715/863 |
| 2015/0074520 | A1* | 3/2015 | Muto .................. G06F 3/0488 715/243 |

\* cited by examiner

FIG. 3A
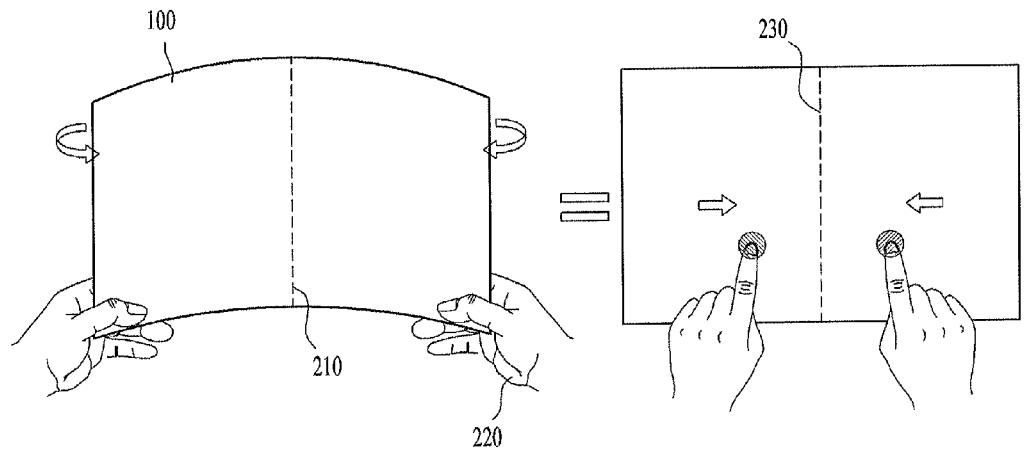
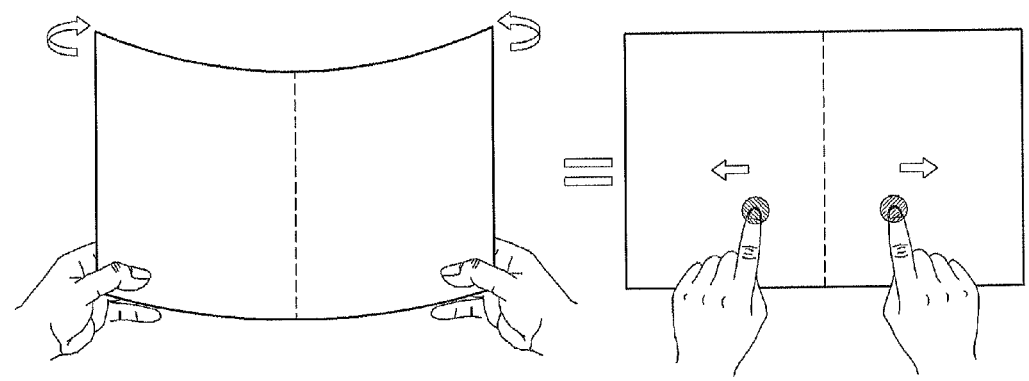
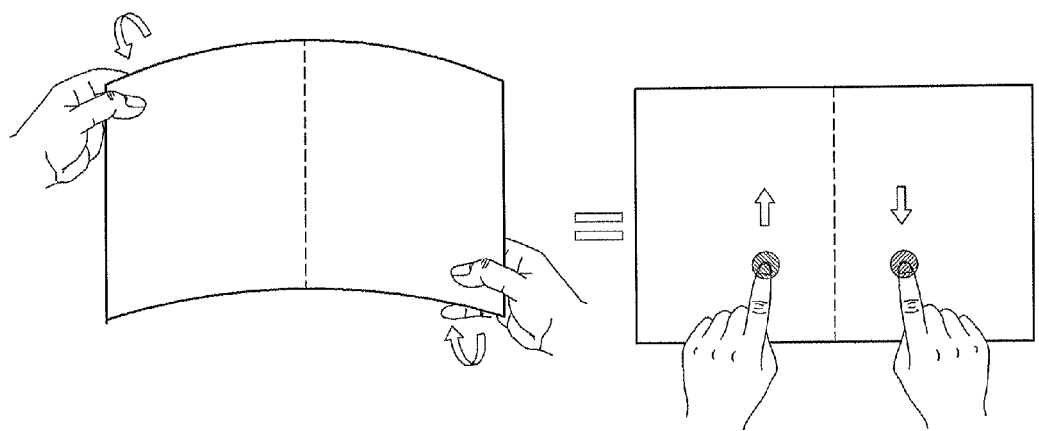

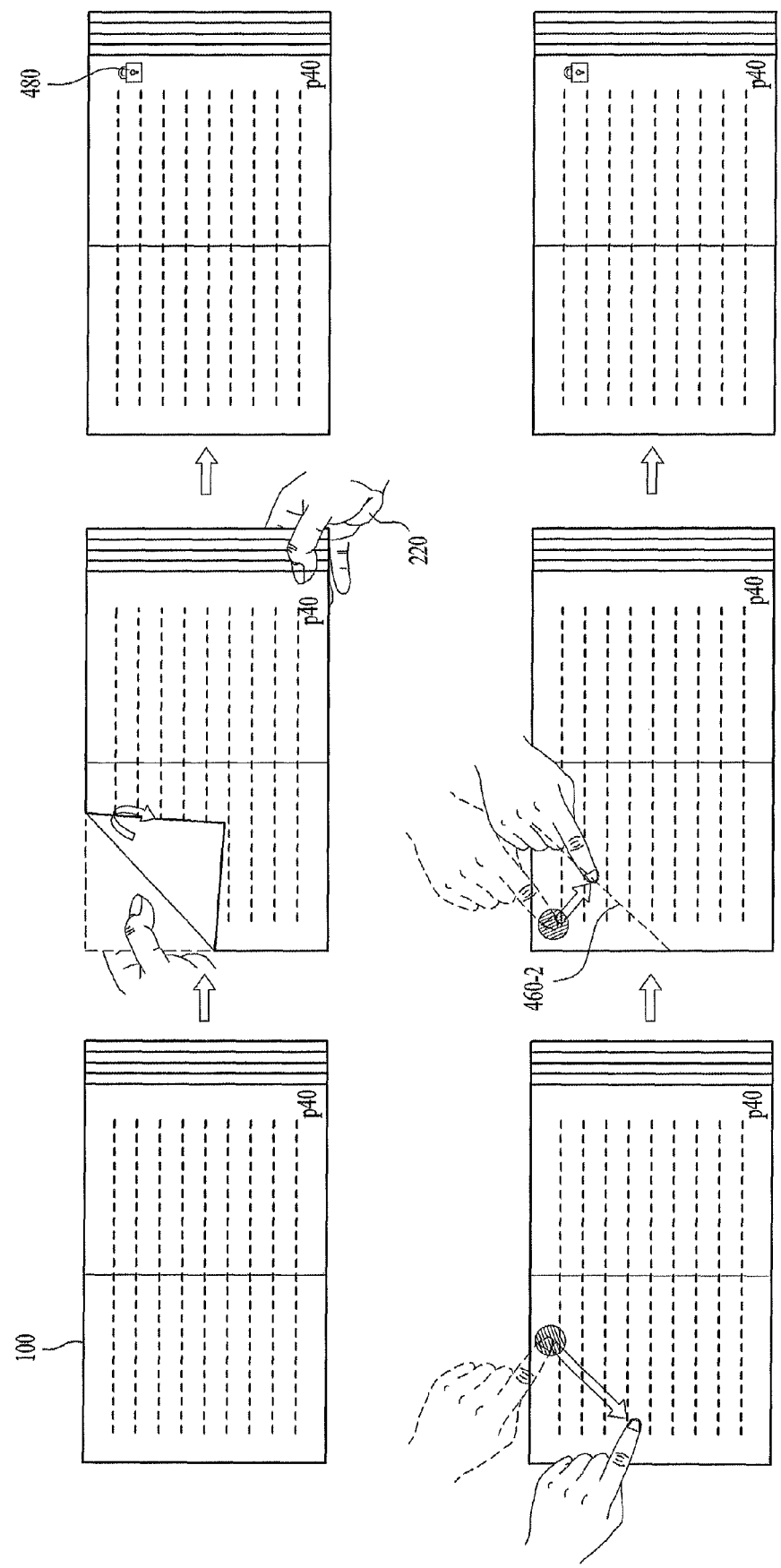

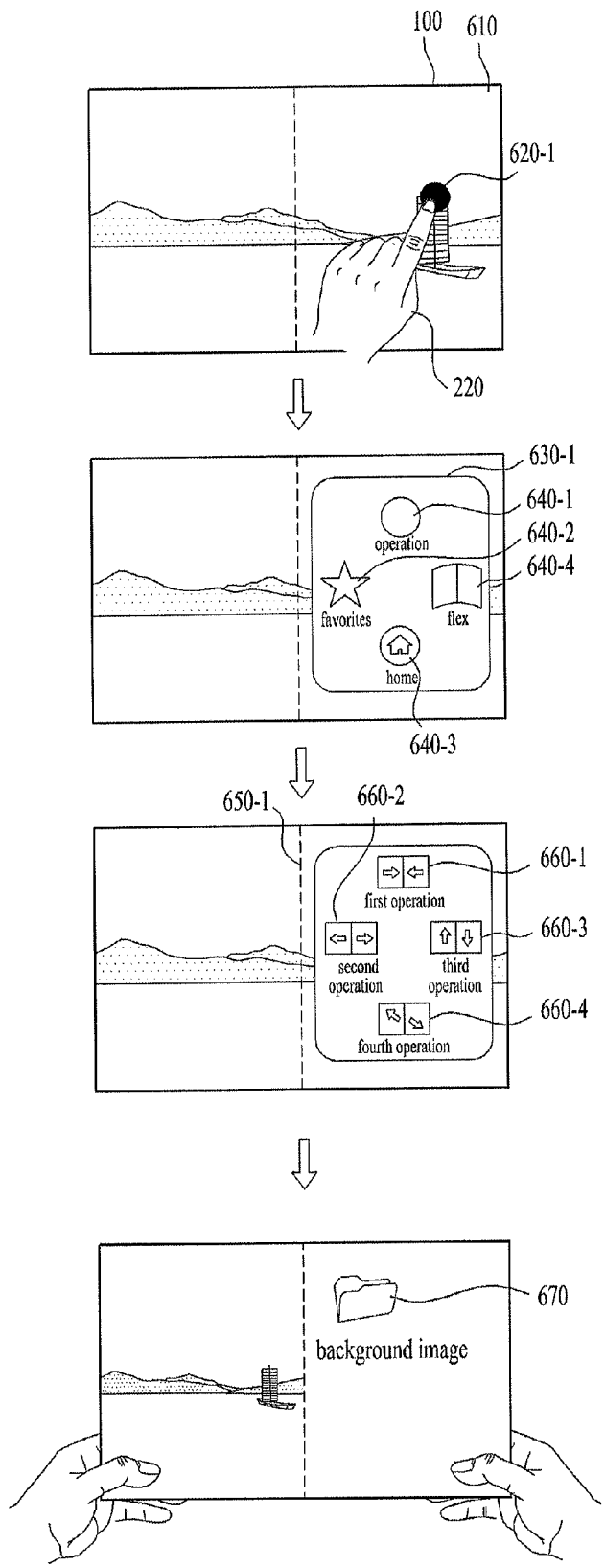

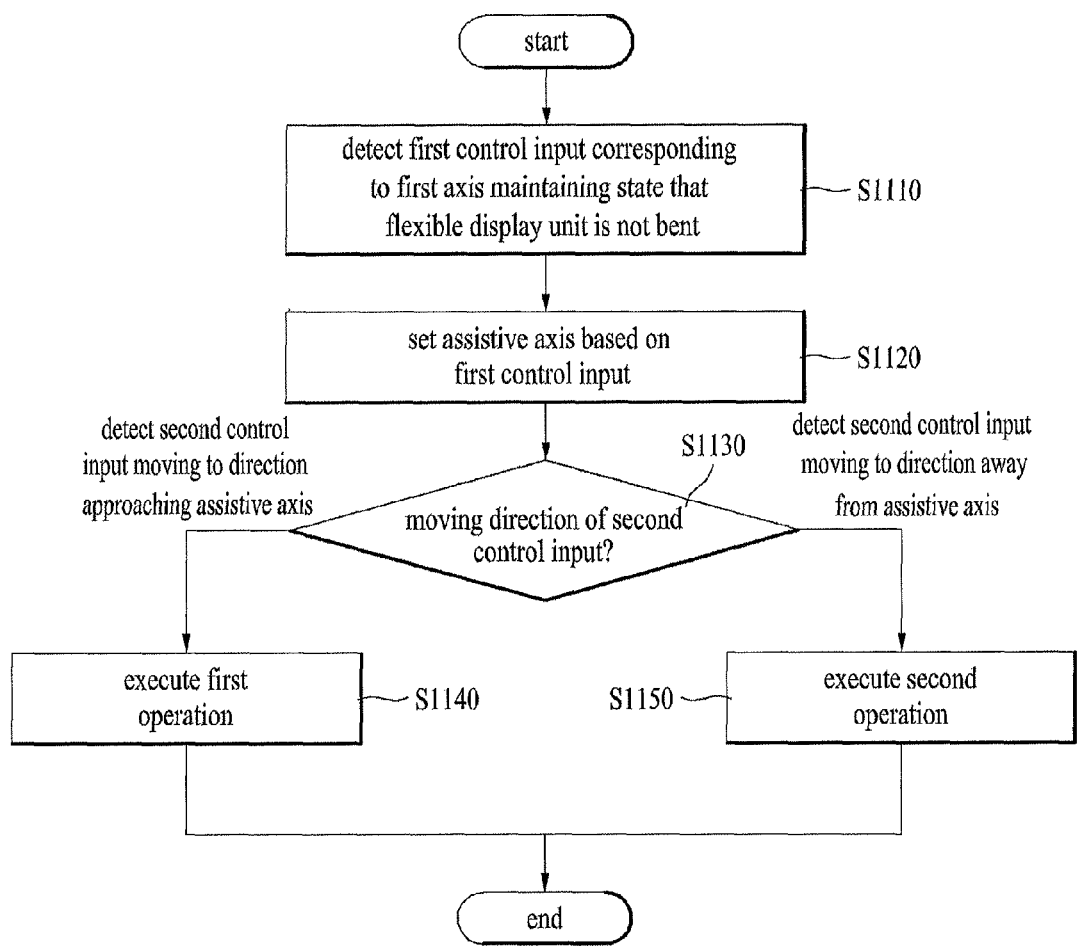

DISPLAY DEVICE EXECUTING BENDING OPERATION AND METHOD OF CONTROLLING THEREFOR

This application claims the benefit of the Korean Patent Application No. 10-2014-0069268, filed on Jun. 9, 2014, which is hereby incorporated by reference as if fully set forth herein.

BACKGROUND OF THE INVENTION

Field of the Invention

The present specification relates to a display device executing a bending operation and a method of controlling therefor.

Discussion of the Related Art

A flexible display device corresponds to a display device including a freely bendable characteristic. The flexible display device can be implemented by a display technology capable of bending or rolling a panel without detriment to the panel in a manner of using such a flexible material as plastic instead of a glass panel. In this case, if the flexible display device detects a transformation of the flexible display device, the flexible display device can execute a predetermined operation based on the transformation. In particular, the flexible display device detects a physical transformation of the flexible display device and can execute an operation based on the physical transformation.

Yet, there is a limit for the flexible display device to implement an operation based on the physical transformation only. Moreover, it is necessary for a user to execute an operation in a state that it is difficult for the user to physically transform the flexible display device. Hence, it is necessary for the flexible display device to configure an operation using a separate control input in response to an operation based on a physical transformation. And, the flexible display device can execute an operation based on a complex physical transformation. In this case, a user may feel uncomfortable due to the complexity of the physical transformation. Hence, it is required for the flexible display device to have a method of executing an operation based on an easy operation in response to the physical transformation.

SUMMARY OF THE INVENTION

Accordingly, the present specification is directed to an apparatus and method thereof that substantially obviate one or more problems due to limitations and disadvantages of the related art.

An object of the present specification is to provide a display device executing a bending operation and a method of controlling therefor.

Another object of the present specification is to provide a method for a display device to detect a bending of a flexible display unit and execute an operation based on the bending.

Another object of the present specification is to provide a method for a display device to execute an operation, which is identical to an operation executed by a bending, based on a control input without physically transforming a flexible display unit.

Another object of the present specification is to provide a method for a display device to configure an assistive axis corresponding to a bending axis where a flexible display unit is bent based on a control input.

Another object of the present specification is to provide a method for a display device to configure an assistive axis in various positions of a flexible display unit.

Another object of the present specification is to provide a method for a display device to execute a plurality of operations based on a control input.

Another object of the present specification is to provide a method for a display device to detect a control input based on an assistive axis and execute an operation identical to an operation executed by a bending using the detected control input.

Another object of the present specification is to provide a method for a display device to display an indicator.

Another object of the present specification is to provide a method for a display device to execute an interface related to a bending of a flexible display unit.

Another object of the present specification is to provide a method for a display device to execute an operation, which is executed by a bending of a flexible display unit, based on a control input selecting an object.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

According to one embodiment of the present specification, a display device executing a bending operation can be provided. The display device can include a flexible display unit configured to display visual information, a bending sensor unit configured to detect a first bending input and a control input sensing unit configured to detect a control input and deliver the detected control input to a processor. In this case, the first bending input can be detected when the flexible display unit is bending to a first direction on the basis of a first axis. And, the display device can include the processor configured to control the flexible display unit, the bending sensor unit and the control input sensing unit and execute a first operation based on the first bending input. In this case, the processor detects a second bending input while maintaining a state that the flexible display unit is not bent and can execute the first operation based on the second bending input. In this case, the second bending input can be detected by a combination of a first control input and a second control input, the first control input corresponds to the first axis and the second control input may correspond to the first direction.

According to a method of controlling a display device executing a bending operation in accordance with one embodiment of the present specification, the display device can detect a first bending input, which is detected when a flexible display unit is bending to a first direction on the basis of a first axis. And, the display device can execute a first operation based on the first bending input. And, the display device can detect a second bending input while maintaining a state that the flexible display unit is not bent and execute the first operation based on the second bending input. In this case, the second bending input is detected by a combination of a first control input and a second control input, the first control input corresponds to the first axis and the second control input may correspond to the first direction.

According to the present specification, it is able to provide a display device executing a bending operation and a method of controlling therefor.

According to the present specification, it is able to provide a method for a display device to detect a bending of a flexible display unit and execute an operation based on the bending.

According to the present specification, it is able to provide a method for a display device to execute an operation, which is identical to an operation executed by a bending, based on a control input without physically transforming a flexible display unit.

According to the present specification, it is able to provide a method for a display device to configure an assistive axis corresponding to a bending axis where a flexible display unit is bent based on a control input.

According to the present specification, it is able to provide a method for a display device to configure an assistive axis in various positions of a flexible display unit.

According to the present specification, it is able to provide a method for a display device to execute a plurality of operations based on a control input.

According to the present specification, it is able to provide a method for a display device to detect a control input based on an assistive axis and execute an operation identical to an operation executed by a bending using the detected control input.

According to the present specification, it is able to provide a method for a display device to execute an operation identical to an operation executed by a bending using a control input.

According to the present specification, it is able to provide a method for a display device to display an indicator.

According to the present specification, it is able to provide a method for a display device to execute an interface related to a bending of a flexible display unit.

According to the present specification, it is able to provide a method for a display device to execute an operation, which is executed by a bending of a flexible display unit, based on a control input selecting an object.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3a to FIG. 3d are diagrams of a method for a display device to execute a plurality of operations according to one embodiment of the present specification;

FIG. 4a to FIG. 4d are diagrams for a method of executing a plurality of operations based on a bending axis according to one embodiment of the present specification;

FIG. 6a to FIG. 6c are diagrams of a method for a display device to execute a bend interface according to one embodiment of the present specification;

FIG. 11 is a flowchart for a method of controlling a display device according to one embodiment of the present specification.

DETAILED DESCRIPTION OF THE INVENTION

While embodiments have been described in detail with reference to the attached drawings and contents written on the drawings, the scope of claims may be non-restricted or non-limited by the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

Moreover, a terminology, each of which includes such an ordinal number as first, second and the like, may be used to describe various components. In doing so, the various components should be non-limited by the corresponding terminologies, respectively. The terminologies are only used for the purpose of discriminating one component from other components. For instance, a first component may be named a second component while coming within the scope of the appended claims and their equivalents. Similarly, the second component may be named the first component.

In the present application, such a terminology as 'comprise', 'include' and the like should be construed not as necessarily excluding various components or steps written in the present specification but as including the components or steps in part or further including additional components or steps. And, such a terminology as 'unit' written in the present specification indicates a unit processing at least one function or an operation and can be implemented by hardware, software or a combination thereof.

Figure 1:
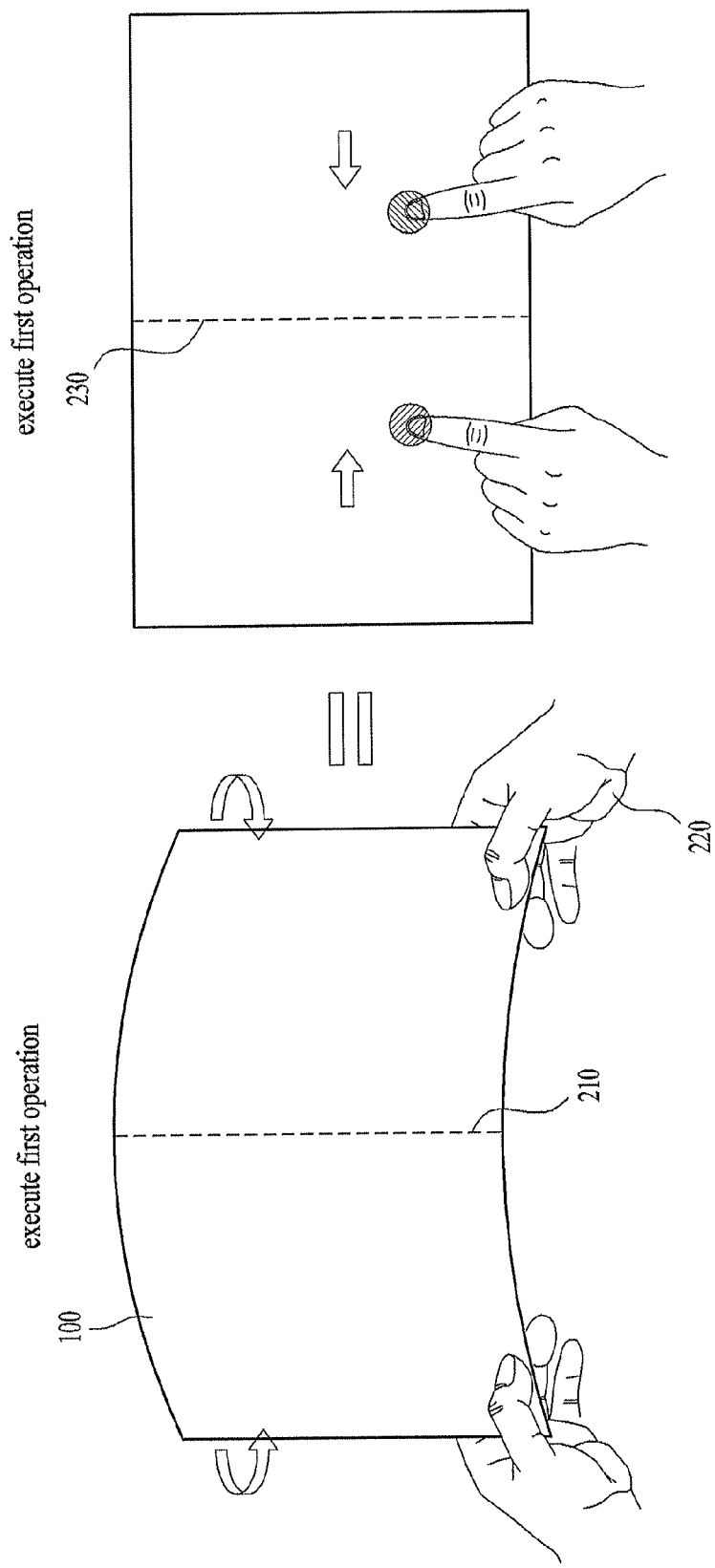
FIG. 1 is a diagram for a method of executing a bending operation using a display device.

FIG. 1 is a diagram for a method of executing a bending operation using a display device. In the present specification, a display device 100 may corresponds to a flexible display device. More specifically, the display device 100 may have a freely bendable characteristic. And, the display device 100 may include a flexible display unit 110. And, the display device 100 may correspond to a partially flexible device. In this case, as an example, the display device 100 may correspond to a smartphone, a smart pad, a tablet, a PDA, a notebook or the like. More specifically, the display device 100 may correspond to a device including a flexible part in the aforementioned electronic device. In particular, the display device 100 corresponds to a device including a flexible area, by which the present specification may be non-limited.

If bending of the flexible display unit 110 is detected, the display device 100 can execute a first operation. In this case, the first operation can be executed based on a bending axis 210 where the flexible display unit 110 is bent and a bending direction. More specifically, the first operation can be differently configured according to a position to which the bending axis is set and the bending direction. In this case, the bending axis 210 may correspond to an axis, which is folded when the flexible display unit 110 is bent. As an example, the bending axis 210 can be configured by the vertical of a center of the flexible display unit 110. And, as an example, the bending axis 210 can be configured by the horizontal of the center of the flexible display unit 110. And, as an example, the bending axis 210 can be configured by a line connecting a center of an upper edge of the flexible display unit 110 and a center of a left edge of the flexible display unit. In particular, the bending axis 210 indicates an axis configurable on the flexible display unit 110 when the flexible display unit 110 is bent, by which the present specification may be non-limited. And, the bending direction may indicate a direction to which the flexible display unit 110 is folded. In this case, as an example, the bending direction may correspond to a direction to which the flexible display unit is folded by the front face. In particular, in case that a user 210 is holding the display device 100, the bending direction may correspond to a direction facing a body of the user 210. And, as an example, the bending direction may correspond to a direction to which the flexible display unit is folded by the rear face. In particular, the bending direction may correspond to a direction to which the flexible display unit is folded, by which the present specification may be non-limited. The display device 100 detects the bending axis and the bending direction by a bending sensor unit 120 and can execute the first operation based on the bending direction.

And, the display device 100 can execute the first operation while maintaining a state that the flexible display unit 110 is not bent. More specifically, the display device 100 can detect a first control input corresponding to the aforementioned bending axis. Subsequently, the display device 100 can detect a second control input corresponding to the aforementioned bending direction. In this case, having detected the first control input and the second control input, the display device 100 can execute the first operation. In this case, if the first control input is detected, the display device 100 can configure an assistive axis 230. In this case, the assistive axis 230 may correspond to the aforementioned bending axis. More specifically, the display device 100 can detect the first control input while maintaining a state that the flexible display unit 110 is not bent. Hence, since the bending axis 210 is not generated on the flexible display unit 110, the display device 100 can make the first control input correspond to the bending axis. And, the display device 100 can make the second control input correspond to the bending direction. Similar to this, the display device 100 can detect a second control input while maintaining a state that the flexible display unit 110 is not bent. In this case, since the flexible display unit 110 is not bent, the display device 100 cannot detect a bending direction. Hence, the display device 100 can detect the second control input corresponding to the bending direction. In this case, as an example, the second control input can be detected based on an assistive axis 230.

The display device 100 can execute the aforementioned first operation, which is executed by bending the flexible display unit, in a manner of combining the first and the second control input with each other. In particular, the display device 100 can execute an operation in response to a physical transformation of the flexible display unit 110 by making the first control input correspond to the bending axis and making the second control input correspond to the bending direction. In this case, the display device 100 can detect bending of the flexible display unit 110, which is physically transformed, as a first bending input. And, the display device 100 can detect an input, which is detected by a combination of the first control input and the second control input without a physical transformation of the flexible display unit 110, as a second bending input. As an example, the display device can detect the first bending input and the second bending input as an identical input executing an identical operation. By doing so, in case that the flexible display unit 110 is unable to be bent, a user 220 can execute an operation identical to an operation executed by bending the flexible display unit. Moreover, the user 220 can prevent a system error occurred by complexity of bending of the flexible display unit 110. More specifically, the display device 100 may not precisely measure the extent of bending of the flexible display unit 110. Hence, the display device 100 may not properly execute an operation which is executed by a physical transformation of the flexible display unit. In this case, the display device 100 can execute more precise operation using the second bending input.

Figure 2:
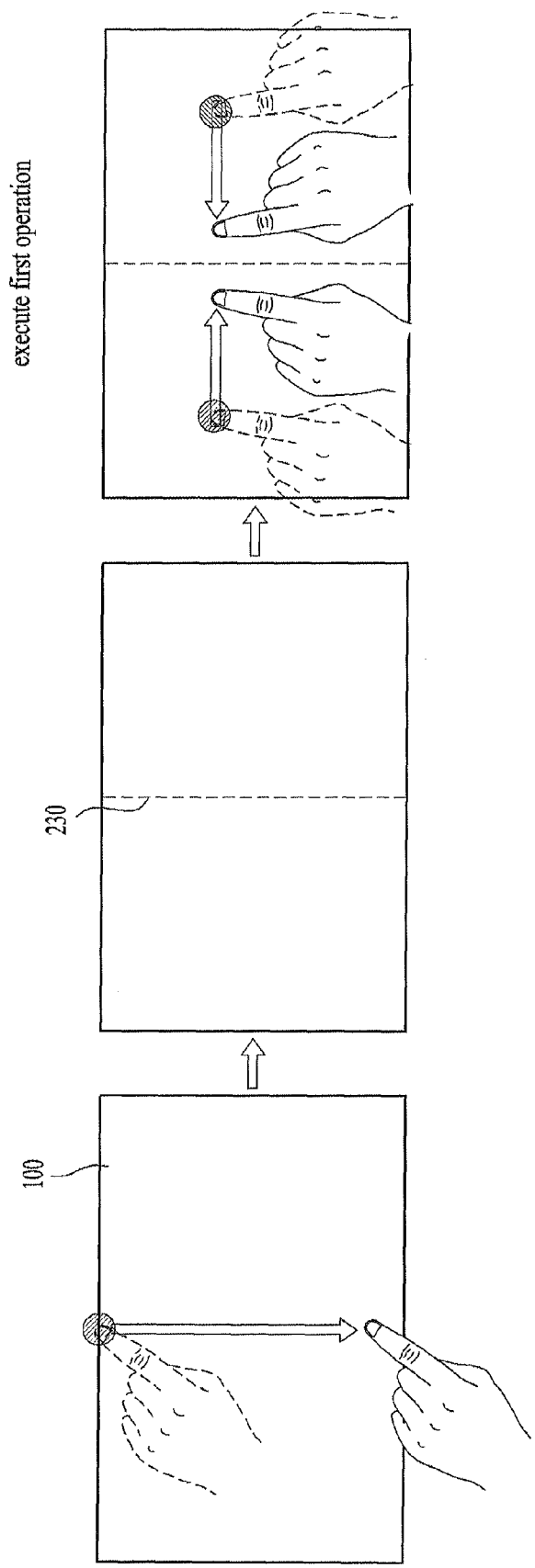
FIG. 2 is a diagram of a method for a display device to execute an operation in a state that a flexible display unit is not bent according to one embodiment of the present specification.

FIG. 2 is a diagram of a method for a display device to execute an operation in a state that a flexible display unit is not bent according to one embodiment of the present specification. As mentioned in the foregoing description, if a first bending input or a second bending input is detected, the display device 100 can execute a first operation. In this case, the second bending input may correspond to a combination of a first control input and a second control input. As an example, if the display device 100 detects the first control input and then detects the second control input within a threshold time, the display device 100 can detect it as the first control input and the second control input are combined with each other. In this case, the threshold time may correspond to a critical time and may have a prescribed error range. And, the threshold time can be configured by a user or a processor 140, by which the present specification may be non-limited.

The display device 100 can detect the second bending input in a manner of detecting the first control input and combining the second control input with the first control input. The display device 100 can execute a first operation based on the second bending input. In this case, as an example, the first control input and the second control input may correspond to at least one selected from the group consisting of a touch input, a gesture input, an input by an input device and a voice input. And, as an example, the first control input and the second control input may correspond to at least one selected from the group consisting of a long touch input, a short touch input and a slide input. In particular, the first control input and the second control input may correspond to an input inputted by a user, by which the present specification may be non-limited. As an example, the first control input and the second control input may correspond to a slide input. In this case, the slide input may correspond to a control input moving in a state that the control input is contacted with the display device 100. And, the slide input may correspond to a control input moving in a state that the control input is not contacted with the display device 100.

As an example, the display device 100 can detect the second control input in a manner of combining a first slide touch input and a second slide touch input with each other. In this case, the first slide touch input can be detected in a first area. And, the second slide touch input can be detected in a second area. In this case, the first area and the second area may correspond to areas distinguished from each other by the aforementioned assistive axis 230. More specifically, the first area and the second area of the flexible display unit 110 may correspond to areas divided into two by the assistive axis 230. As an example, if the display device 100 detects that the first slide touch input moves to a first reference direction and the second slide touch input moves to a second reference direction, the display device can detect the second control input. In this case, the first reference direction and the second reference direction may correspond to a direction approaching to the assistive axis 230 and can be configured on the basis of the assistive axis 230. In particular, the display device 100 can detect the second control input based on a direction to which an input is slid on the basis of the assistive axis 230.

And, as an example, the first control input and the second control input may correspond to a single control input. More specifically, if an integrated single control input is detected, the display device 100 detects the second bending input and can execute the first operation. In particular, the first control input and the second control input are not limited by the aforementioned embodiment and can be configured by a user or a processor 140.

FIG. 3*a* to FIG. 3*d* are diagrams of a method for a display device to execute a plurality of operations according to one embodiment of the present specification.

Referring to FIG. 3*a*, if the flexible display unit 110 is bent, the display device 100 can execute an operation based on a bending axis and a bending direction. And, the display device 100 can execute the operation in a manner of combining a first control input corresponding to the bending axis and a second control input corresponding to the bending direction with each other in a state that the flexible display unit 110 is not bent. In this case, the display device 100 can execute a different operation according to a bending direction in response to an identical bending axis. Similar to this, the display device 100 can execute a different operation in a manner of controlling the second control input in the state that the flexible display unit 110 is not bent. More specifically, the display device 100 can configure an assistive axis using the first control input corresponding to the bending axis. Subsequently, the display device 100 can execute each operation corresponding to the bending direction in a manner of differently configuring the second control input based on the bending direction.

As an example, the display device 100 can detect that the flexible display unit 110 is bending to an inside direction on the basis of a first axis 210. In this case, the display device 100 can execute a first operation. And, the display device 100 can configure the assistive axis 230 based on the first control input in the state that the flexible display unit 110 is not bent. In this case, the display device 100 can detect a first slide touch input and a second slide touch input as the second control input. In this case, if the display device 100 detects that the first slide touch input and the second slide touch input move to a direction approaching to the assistive axis 230, the display device 100 can execute the first operation. In particular, the direction approaching to the assistive axis 230 corresponds to the direction to which the flexible display unit 110 is bending to the inside direction. The display device can execute the identical first operation.

Similar to this, the display device 100 can detect that the flexible display unit 110 is bending to an outside direction on the basis of the first axis 210. In this case, the display device 100 can execute a second operation. And, the display device 100 can detect a first slide touch input and a second slide touch input as the second control input in a state that the flexible display unit 110 is not bent. In this case, if the display device 100 detects that the first slide touch input and the second slide touch input move in a direction away from the assistive axis 230, the display device 100 can execute the second operation. In particular, the direction away from the assistive axis 230 corresponds to the direction to which the flexible display unit 110 is bending to the outside direction. The display device can execute the identical second operation.

And, as an example, the display device can detect that a left area of the flexible display unit 110 is bending to the top and a right area of the flexible display unit is bending to the bottom on the basis of the first axis 210. In this case, the display device 100 can execute a third operation. And, the display device 100 can detect a first slide touch input and a second slide touch input as the second control input in a state that the flexible display unit 110 is not bent. In this case, if the display device 100 detects that the first slide touch input moves to the top according to the assistive axis 230 and the second slide touch input moves to the bottom according to the assistive axis 230, the display device 100 can execute the third operation.

In particular, the display device 100 configures an identical assistive axis 230 based on the first control input and can execute a plurality of operations corresponding to a bending direction of the flexible display unit 110 using the second control input, by which the present specification may be non-limited.

Figure 3B:
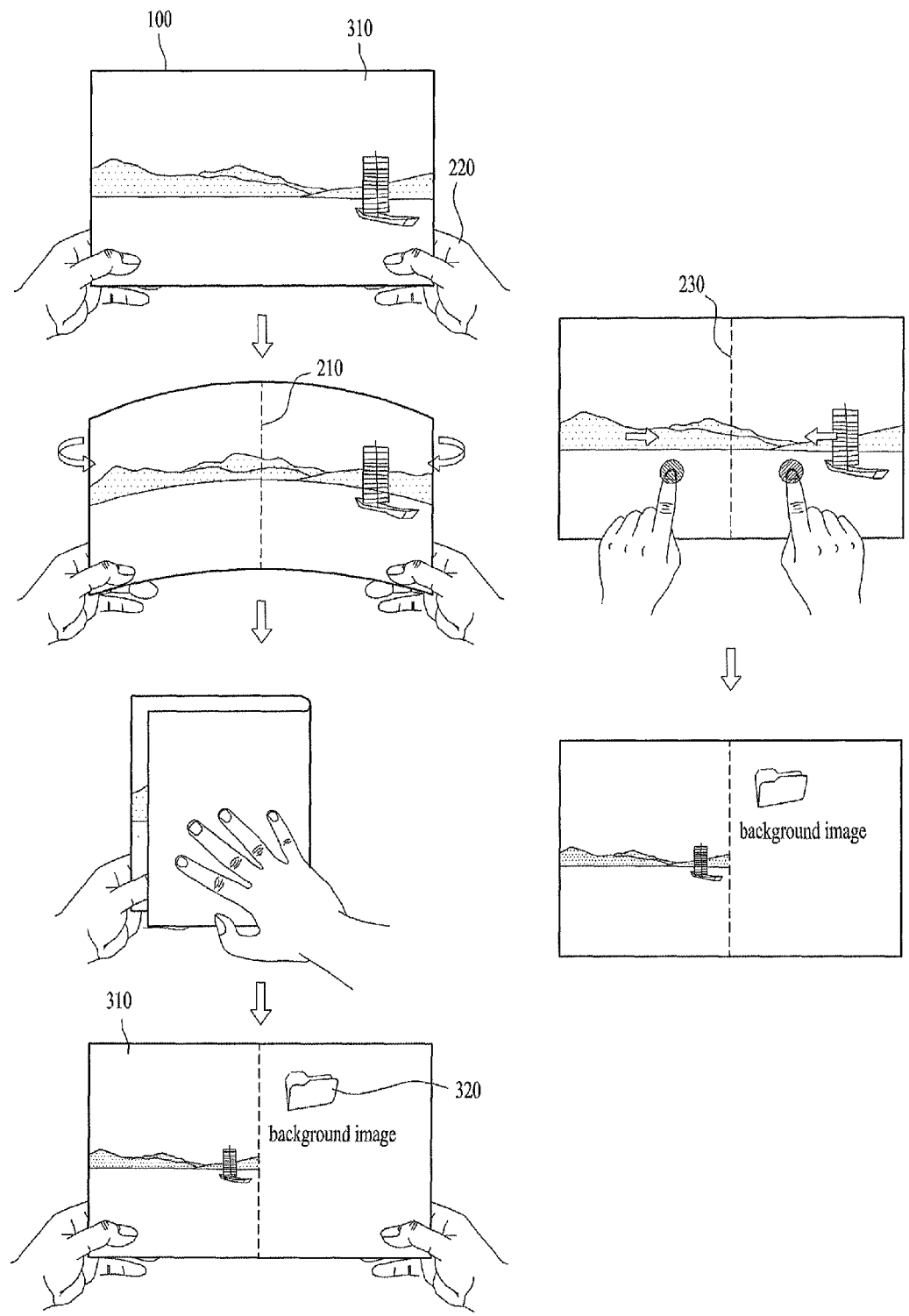

More specifically, referring to FIG. 3*b*, the display device 100 can display first visual information 310. In this case, if the display device executes the aforementioned first operation, the first visual information 310 is displayed in a left area of an assistive axis (or a bending axis) and second visual information 320 is displayed in a right area of the assistive axis. In this case, the second visual information 320 may correspond to a directory menu related to the first visual information 310. As an example, the first operation may correspond to an operation executing a directory interface including the second visual information 320. In this case, the aforementioned first operation may correspond to an operation which is executed when the flexible display unit 110 is bending to an inside direction. And, the first operation may correspond to an operation executed based on the second control input moving to a direction of the assistive axis 230 in the state that the flexible display unit 110 is not bent.

And, as an example, if the display device 100 is folded more than a predetermined angle on the basis of a bending axis, the display device can execute the first operation. In this case, if the display device 100 detects that the flexible display unit 110 is bending less than the predetermined angle on the basis of the bending axis, the display device can execute an operation different from the first operation. In particular, the display device 100 can control an operation in consideration of a bending angle of the flexible display unit 110, by which the present specification may be non-limited.

Figure 3C:
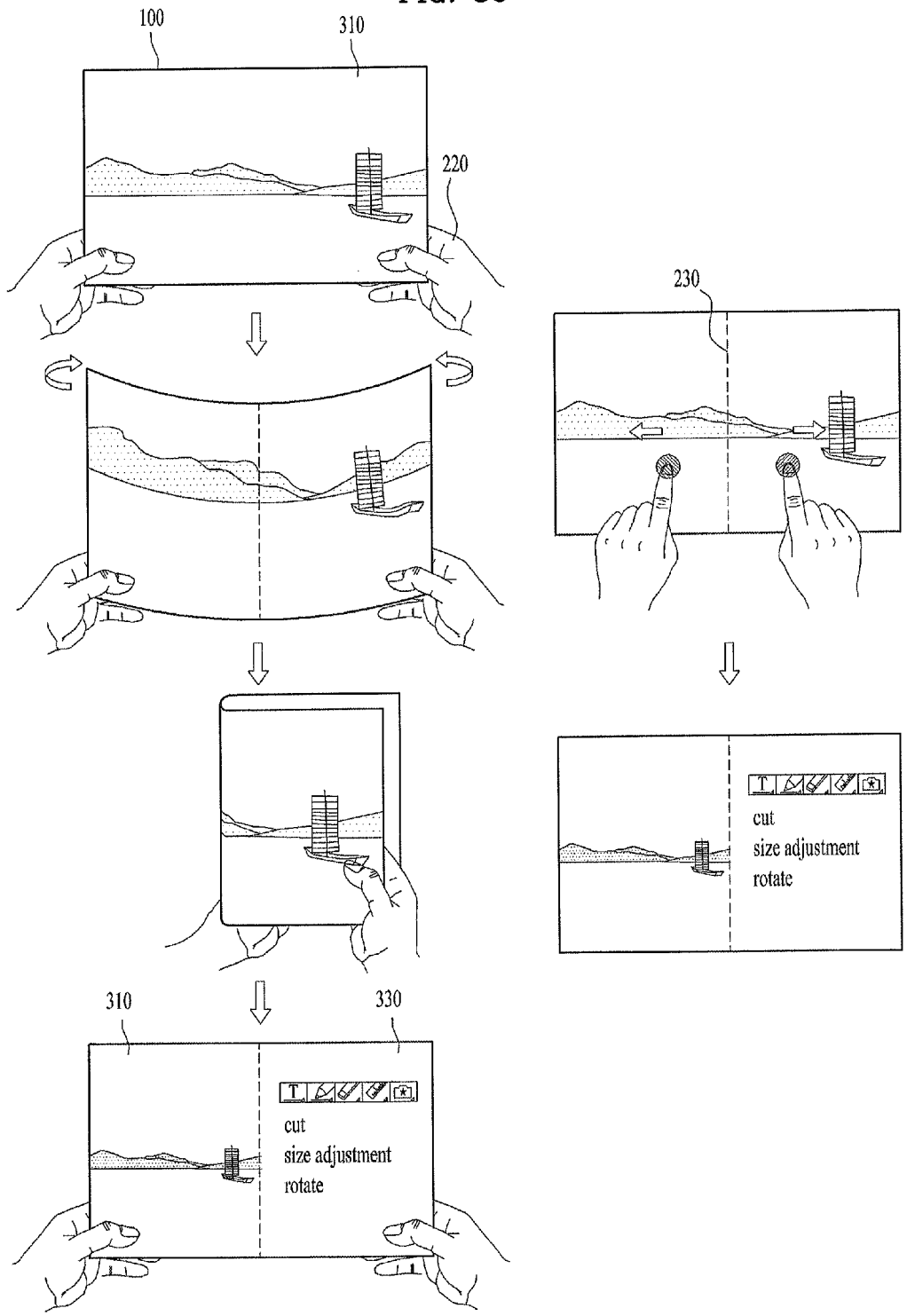

And, referring to FIG. 3*c*, if the display device executes the aforementioned second operation, the first visual information 310 is displayed in the left area of the assistive axis (or the bending axis) and third visual information 330 is displayed in the right area of the assistive axis. In this case, the third visual information 330 may correspond to an edit menu related to the first visual information 310. As an example, the second operation may correspond to an operation executing an edit menu interface including the third visual information 330.

Figure 3D:
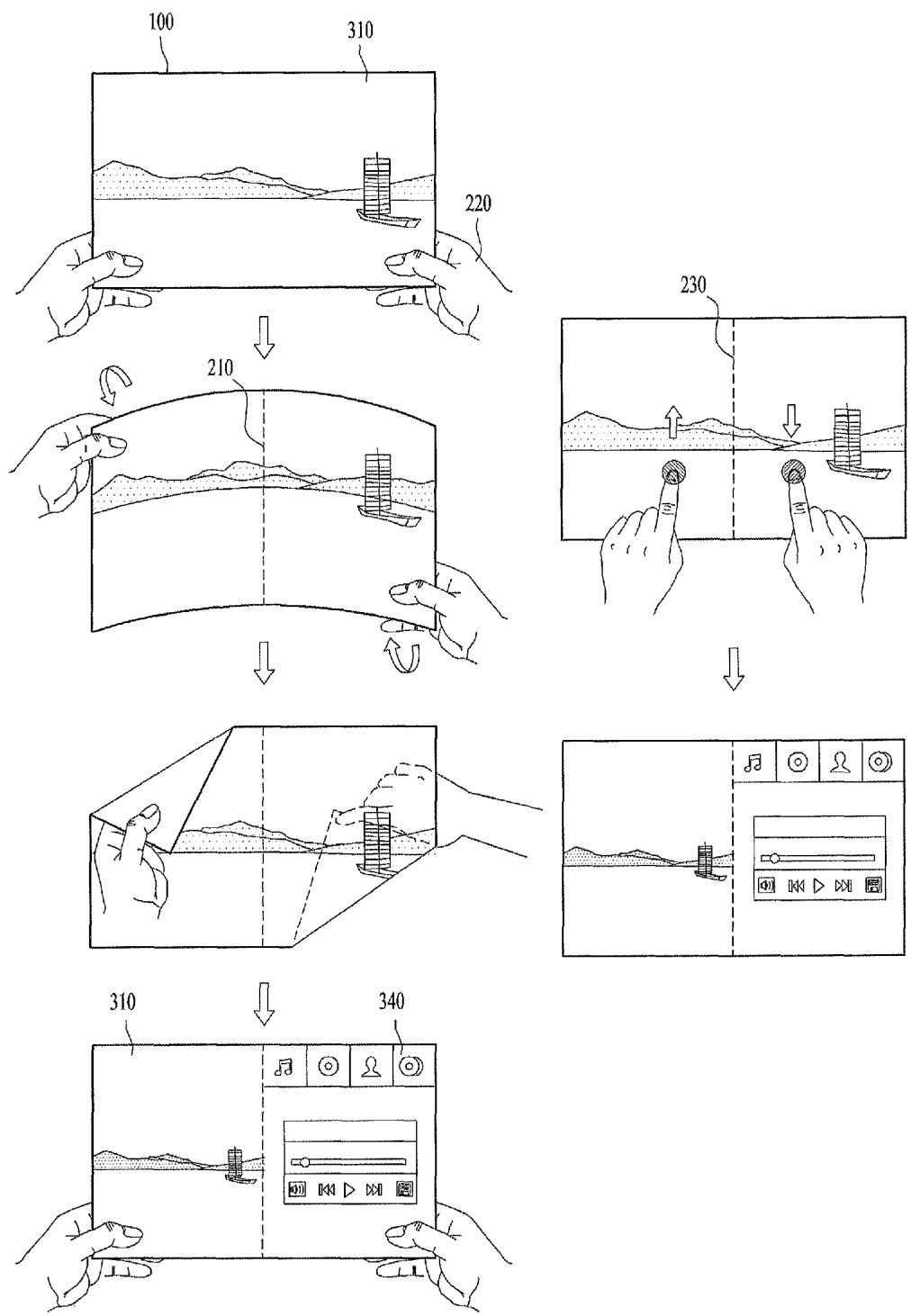

And, referring to FIG. 3d, if the display device executes a third operation, the first visual information 310 is displayed in the left area of the assistive axis (or the bending axis) and fourth visual information 340 is displayed in the right area of the assistive axis. In this case, the fourth visual information 340 may correspond to information irrespective of the first visual information 310. As an example, the display device 100 can execute an interface irrespective of the first visual information 310 using the third operation.

In particular, the display device 100 can configure a control command controlling the display device 100 using an operation based on a bending direction, by which the present specification may be non-limited.

FIG. 4a to FIG. 4d are diagrams of a method for a display device to execute a plurality of operations based on a bending axis according to one embodiment of the present specification.

The display device 100 can execute an operation based on a position to which a bending axis of the flexible display unit 110 is set. And, the display device 100 can execute an operation based on a position of an assistive axis, which is configured based on a first control input, in a state that the flexible display unit 110 is not bent. More specifically, if the flexible display unit 110 is bending, the display device 100 can detect a bending axis configured by a user. Similar to this, the display device 100 can detect the first control input moving from a first position to a second position of the flexible display unit 110. The display device 100 can configure an assistive axis based on the first position and the second position.

Figure 4A:
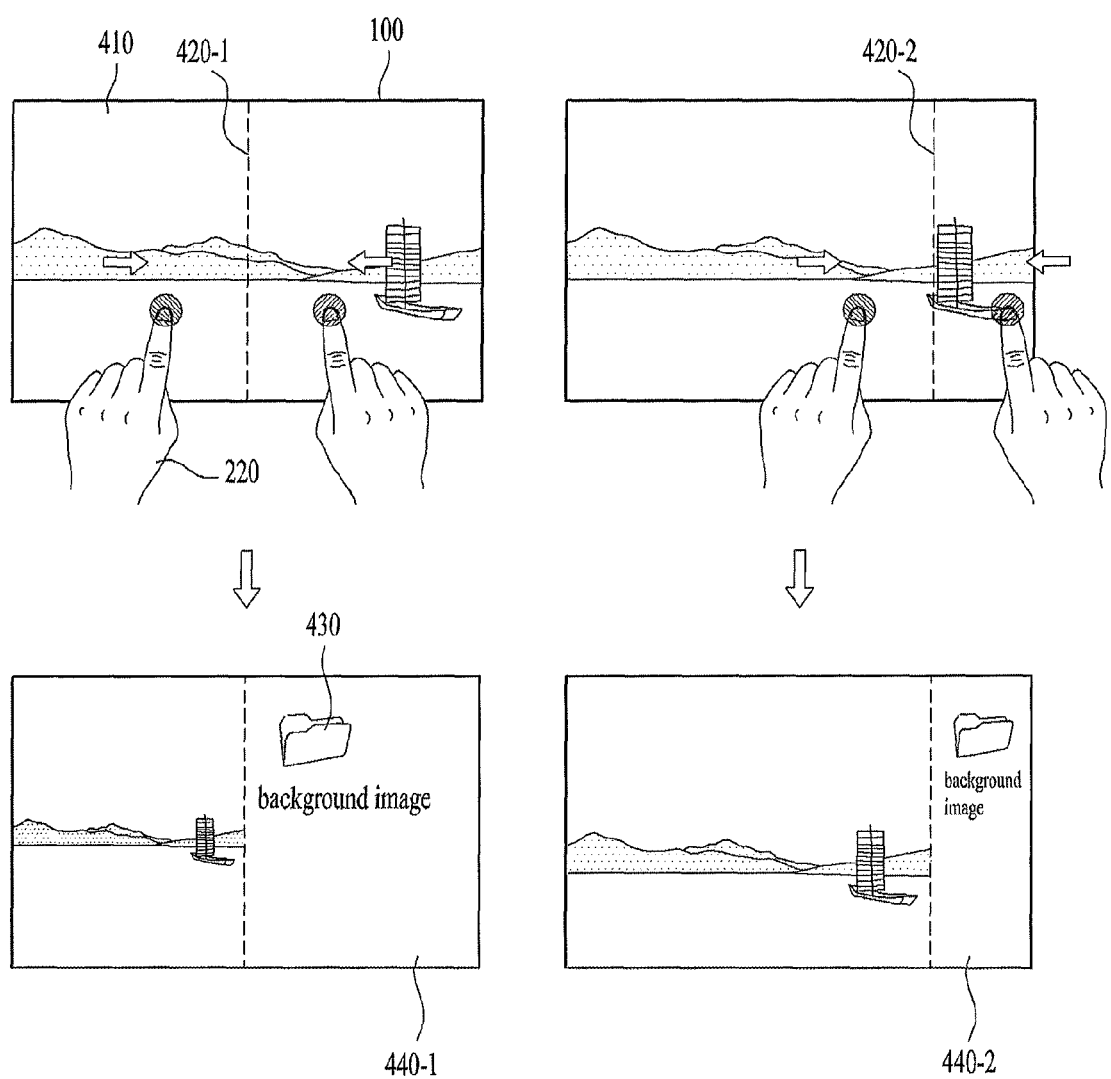

In this case, referring to FIG. 4a, the display device 100 can display first visual information 410. In this case, the display device 100 detects a first control input moving from a first position to a second position and can configure a first assistive axis 420-1. If the display device 100 detects a second control input on the basis of the first assistive axis 420-1, the display device 100 can execute a first operation. In this case, as an example, the first operation may correspond to an operation displaying second visual information 430 related to the first visual information 410 in a first area 440-1. And, the display device 100 detects a first control input moving from a third position to a fourth position and can configure a second assistive axis 420-2. In this case, the second assistive axis 420-2 can be positioned at the right side of the first assistive axis 420-1. If the display device 100 detects the second control input on the basis of the second assistive axis 420-2, the display device 100 can execute the first operation. In this case, as an example, the first operation may correspond to an operation displaying the second visual information 430 related to the first visual information 410 in a second area 440-2. In this case, if the second assistive axis 420-2 is positioned at the right side of the first assistive axis 420-1, the display device 100 can configure the second area 440-2 to be smaller than the first area 440-1. In particular, the display device 100 can differently configure a display area based on a position of an assistive axis for an identical operation.

Figure 4B:
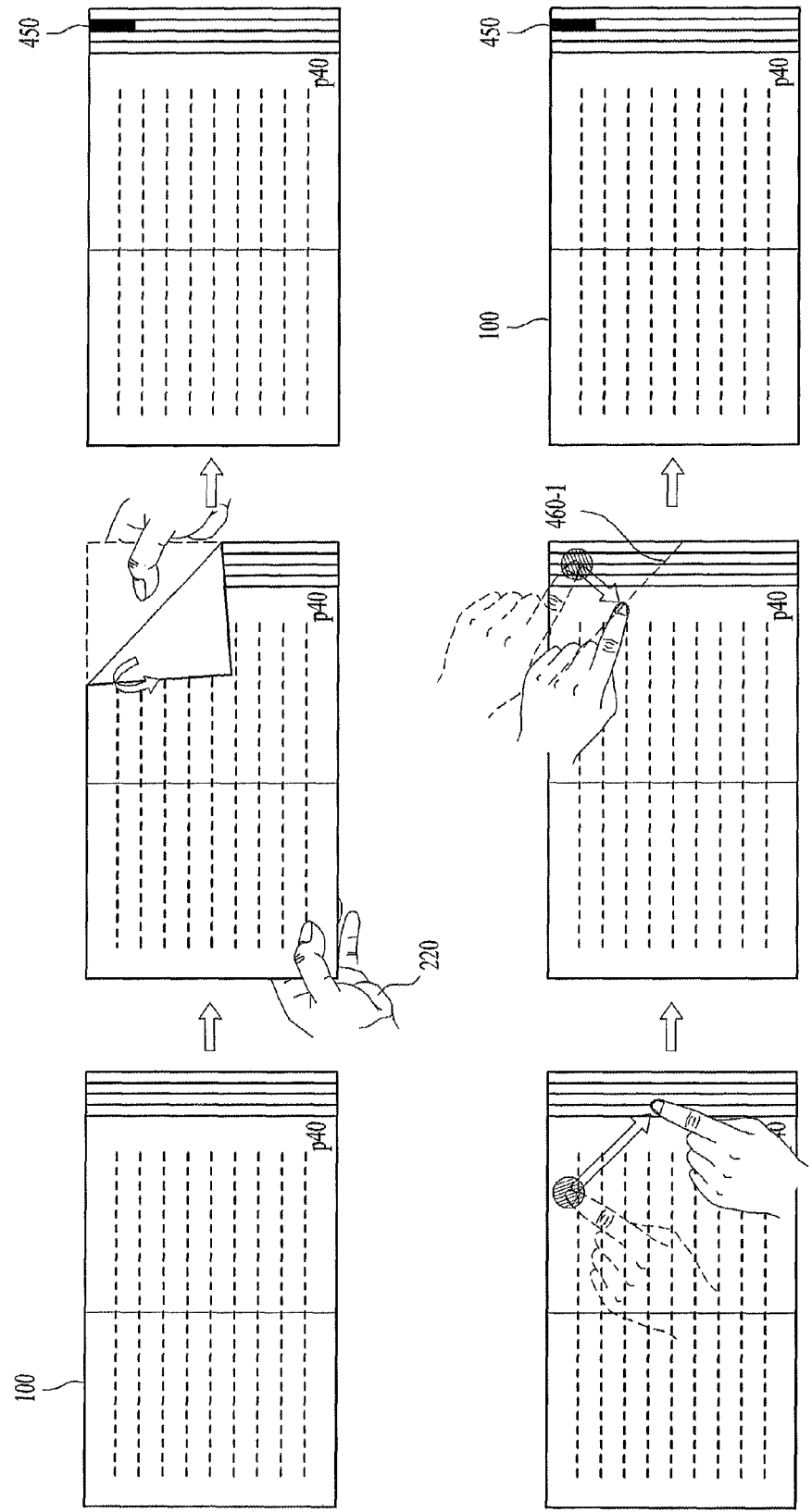
Figure 4C:
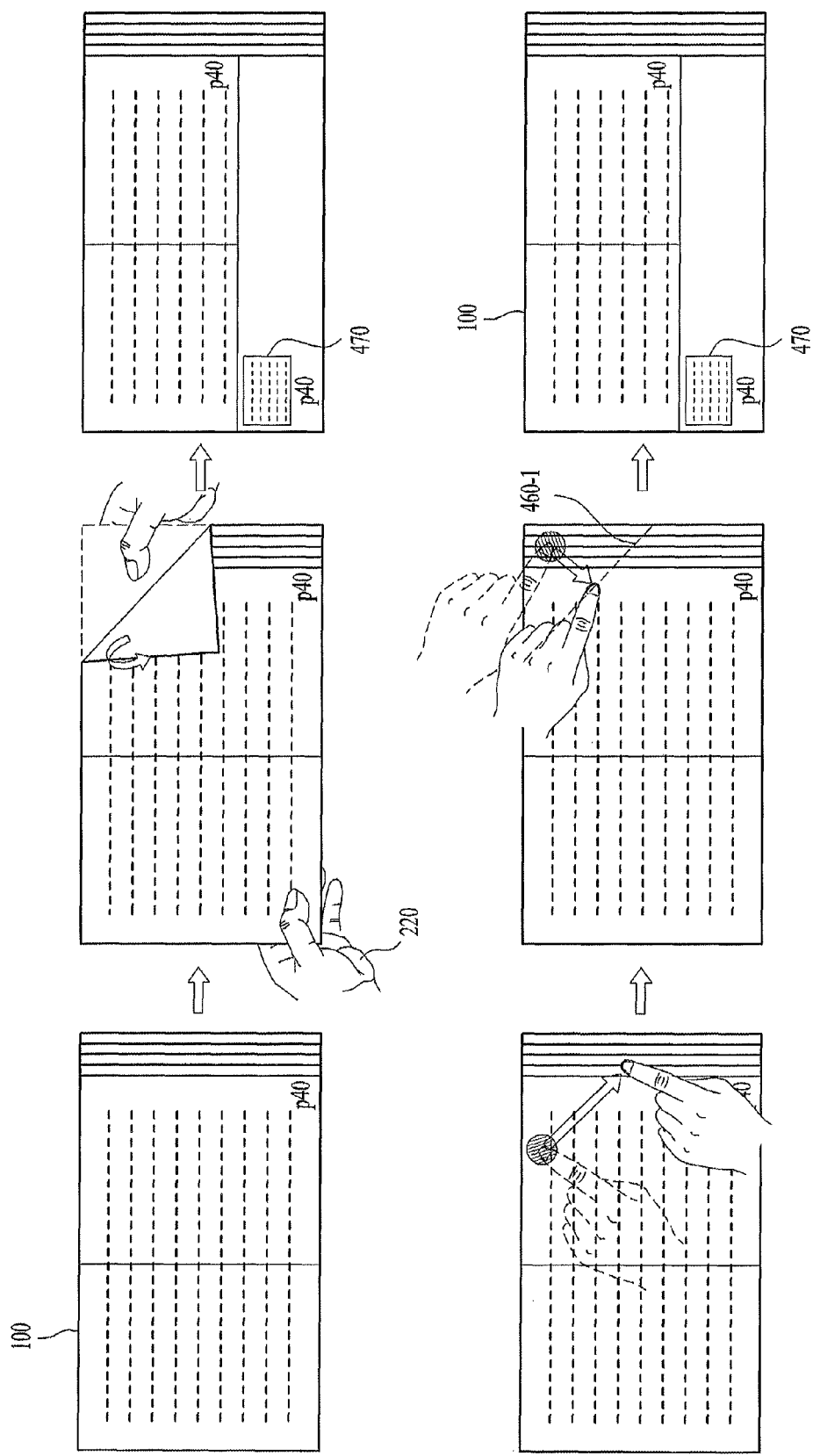

And, as an example, referring to FIG. 4b to FIG. 4c, the display device 100 can configure a line connecting an edge of a top side of the flexible display unit 110 and an edge of a right side of the flexible display unit as a bending axis. The display device 100 can detect a first bending input that the flexible display unit 110 is bending on the basis of the aforementioned bending axis. In this case, the display device 100 can execute an operation based on the bending axis. In this case, as an example, the operation may correspond to a bookmark operation executing a bookmark for an e-book displayed by the display device 100. The display device 100 can display a bookmark indicator based on the bookmark operation. As an example, the display device 100 can display a first bookmark indicator 450 in an area in which a page part of the e-book is indicated. And, as an example, referring to FIG. 4c, the display device 100 can display a second bookmark indicator 470 in a manner of assigning a part of area to the flexible display unit 110. The display device 100 can display the bookmark indicator based on the aforementioned bending axis, by which the present specification may be non-limited.

Similar to this, the display device 100 can detect a first control input in a state that the flexible display unit 110 is not bent. In this case, the first control input may correspond to a control input moving a position corresponding to the aforementioned bending axis. If the display device 100 detects the first control input, the display device 100 can configure a third assistive axis 460-1. If the display device 100 detects a second control input on the basis of the third assistive axis 460-1, the display device can detect a second bending input. The display device can execute an operation based on the second bending input. In this case, the operation may correspond to a bookmark operation, which is identical to the aforementioned operation. As an example, the display device 100 can display the first bookmark indicator 450 or the second bookmark indicator 470 based on the second bending input.

And, as an example, referring to FIG. 4d, the display device 100 can configure a line connecting an edge of a top side of the flexible display unit 110 and an edge of a left side of the flexible display unit as a bending axis. The display device 100 can detect a first bending input that the flexible display unit 110 is bending on the basis of the aforementioned bending axis. In this case, the display device 100 can execute an operation based on the bending axis. In this case, as an example, the operation may correspond to a lock operation for an e-book displayed by the display device 100. The display device 100 can display a lock indicator 480 based on the lock operation. And, similar to this, the display device 100 can detect a first control input in a state that the flexible display unit 110 is not bent. In this case, the first control input may correspond to a control input moving a position corresponding to the aforementioned bending axis. If the display device 100 detects the first control input, the display device 100 can configure a fourth assistive axis 460-2. If the display device 100 detects a second control input on the basis of the fourth assistive axis 460-2, the display device can detect a second bending input. The display device can execute an operation based on the second bending input. In this case, the operation may correspond to a lock operation, which is identical to the aforementioned operation. And, the display device 100 can display the lock indicator 480 based on the lock operation.

Figure 5A:
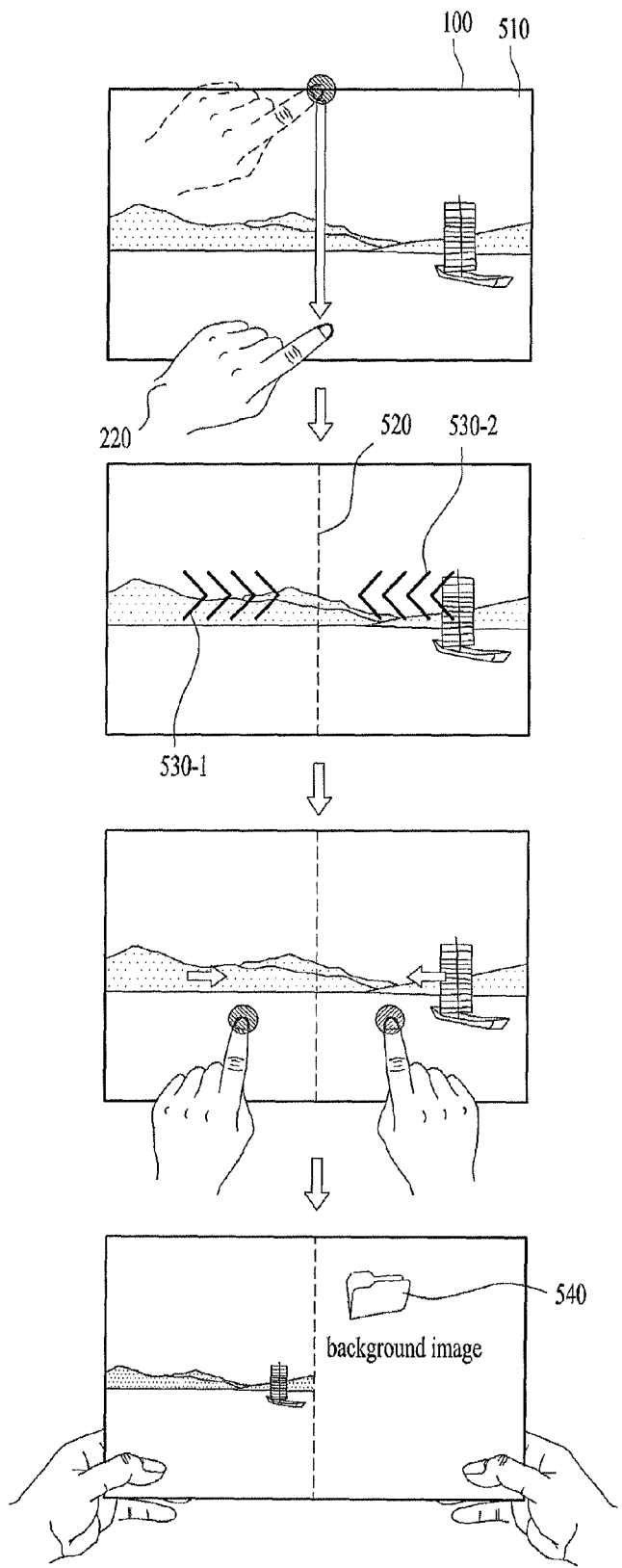
FIG. 5a to FIG. 5c are diagrams of a method for a display device to display an indicator according to one embodiment of the present specification.
Figure 5B:
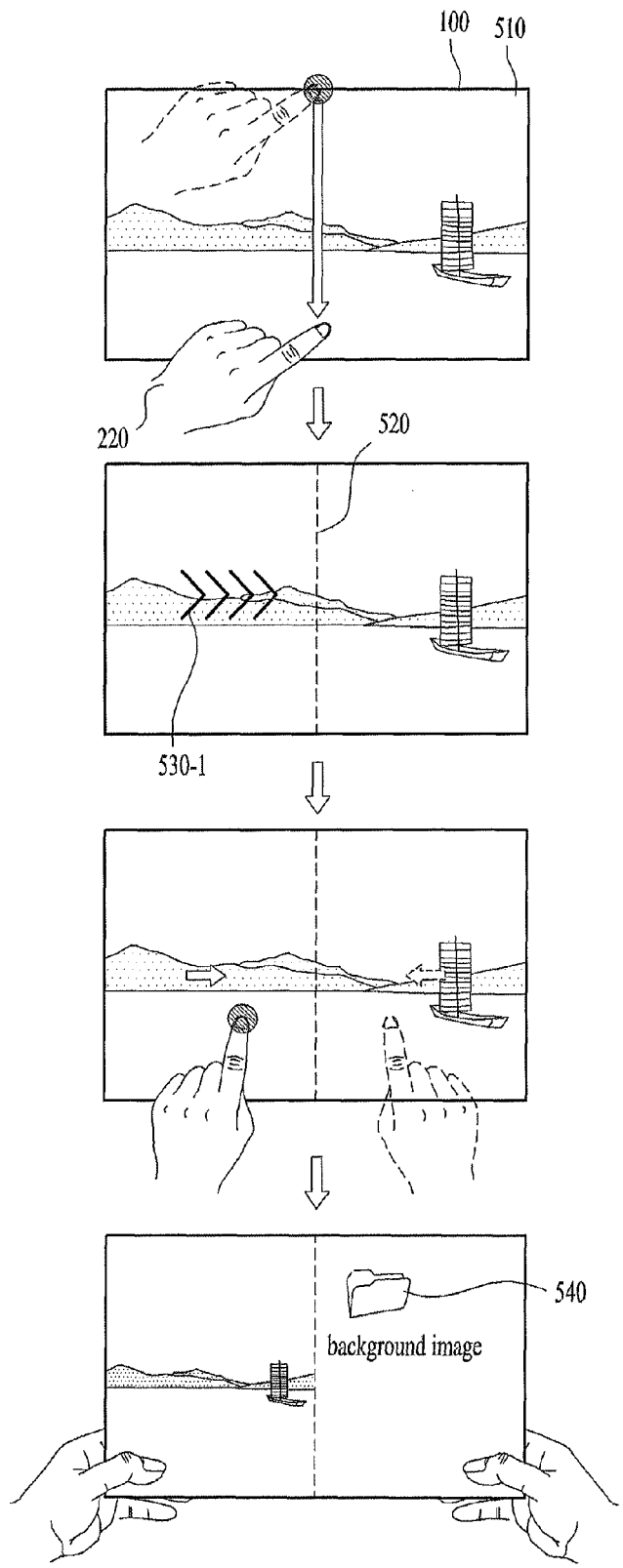
Figure 5C:
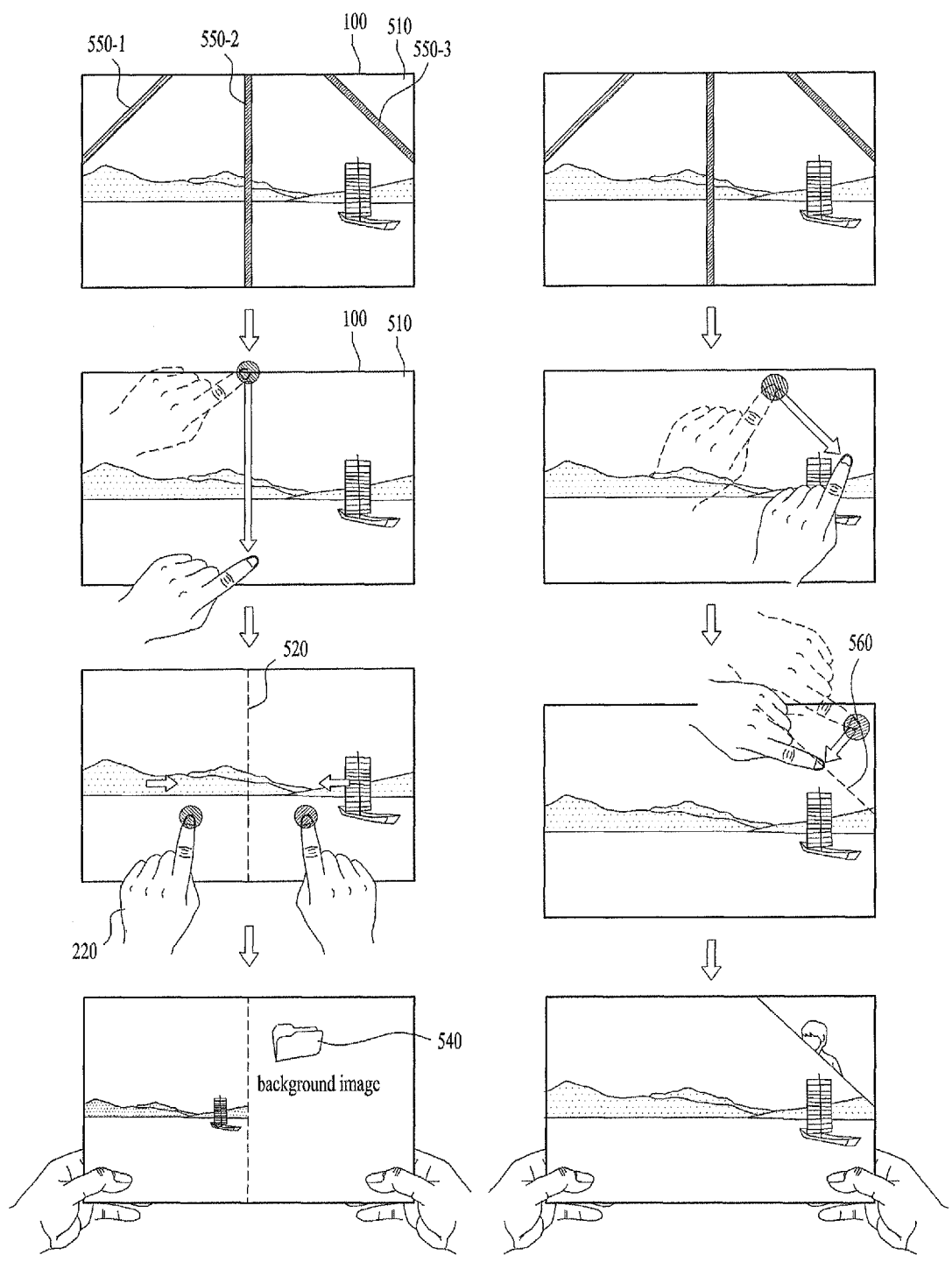

FIG. 5a to FIG. 5c are diagrams of a method for a display device to display an indicator according to one embodiment of the present specification. The display device 100 can display an indicator indicating a method of executing an operation. More specifically, the display device 100 can execute a plurality of operations based on a bending axis and a bending direction set to the flexible display unit 110.

Similar to this, the display device 100 can execute a plurality of operations based on a first control input and a second control input in a state that the flexible display unit 110 is not bent. Hence, in case that there exist a plurality of the operation, a user may not know a control input for an operation for which the user intends to execute. The display device 100 can guide a method of executing the operation executed by the user via an indicator.

As an example, referring to FIG. 5a, the display device 100 can display first visual information 510. In this case, if the display device 100 detects a first control input, the display device can configure an assistive axis 520. And, the display device 100 can display direction indicators 530-1/530-2 for a second control input. In this case, as an example, the display device 100 can display the direction indicators 530-1/530-2 based on the assistive axis 520. If the display device 100 detects the second control input based on the direction indicators 530-1/530-2, the display device 100 can execute an operation.

And, as an example, referring to FIG. 5b, the display device 100 can display a first direction indicator 530-1 only among a plurality of the direction indicators 530-1/530-2. In this case, as an example, when a first slide touch input and a second slide touch input are symmetrical to each other, if the display device 100 detects one of the first slide touch input and the second slide touch input, the display device 100 can detect the second control input. In particular, the display device 100 can detect the second control input in a manner of detecting one of the symmetrical slide touch inputs only and detecting another input as a virtual slide input. In this case, as an example, the display device 100 can display the first direction indicator 530-1 for the first slide touch input. The display device 100 detects the first slide touch input based on the first direction indicator 530-1 and can detect the second control input. The display device 100 can execute an operation based on the second control input.

And, as an example, referring to FIG. 5c, the display device 100 can display at least one of a plurality of operation indicators 550-1/550-2/550-3 before detecting a first control input. In this case, a plurality of the operation indicators 550-1/550-2/550-3 may correspond to an indicator indicating a direction of the first control input configuring an assistive axis. And, as an example, the display device 100 can further display operation information related to each of a plurality of the operation indicators 550-1/550-2/550-3. By doing so, a user can check an operation intended to be executed and the direction of the first control input.

Figure 6B:
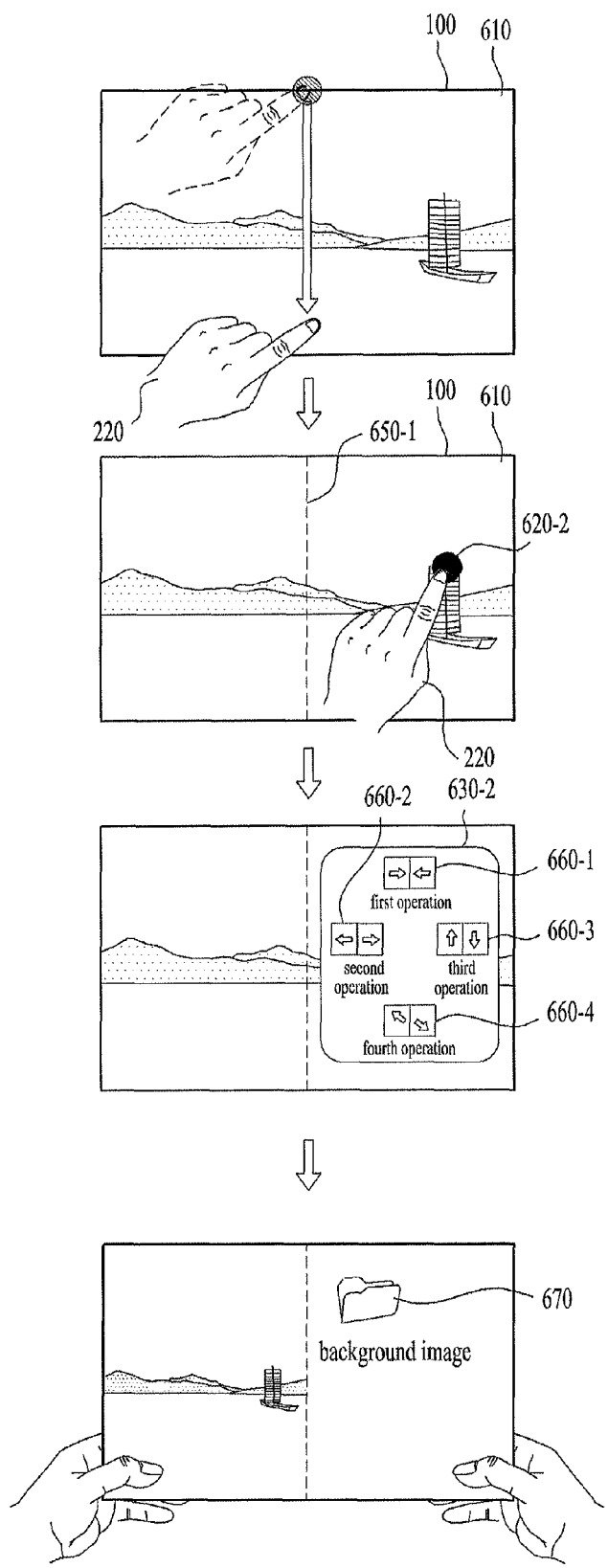
Figure 6C:
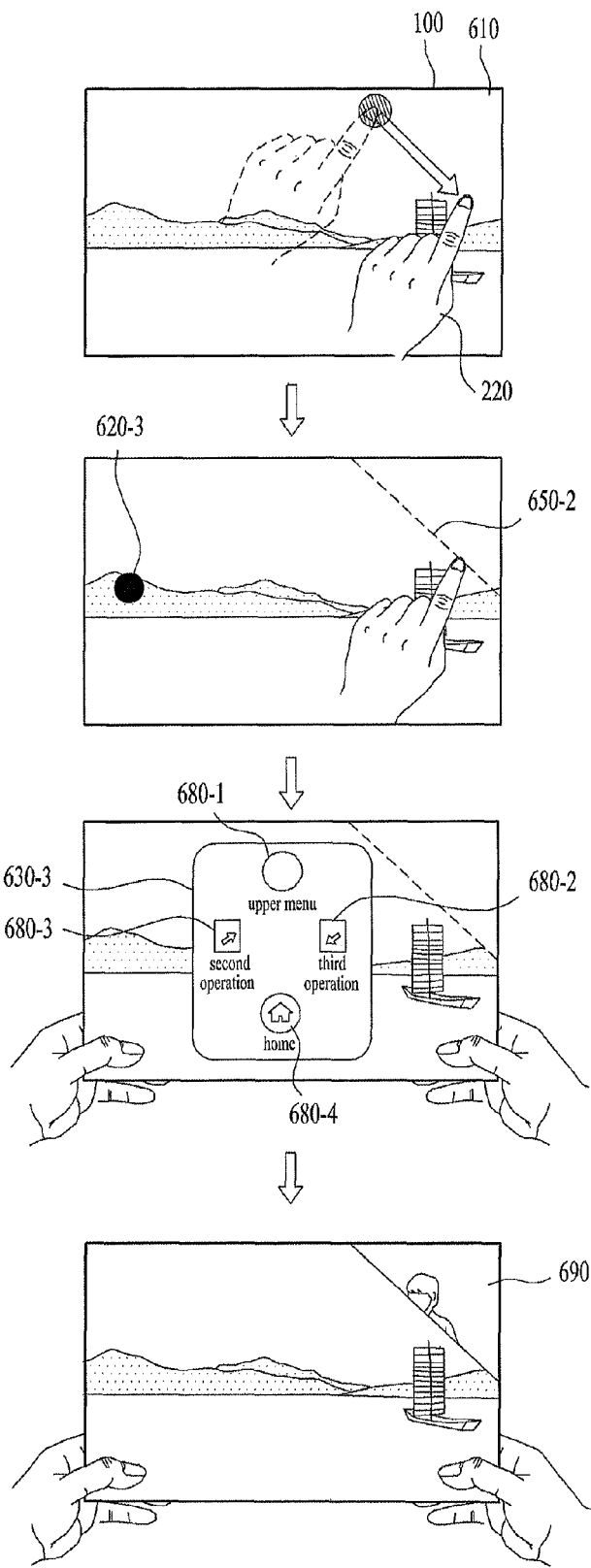

FIG. 6a to FIG. 6c are diagrams of a method for a display device to execute a bend interface according to one embodiment of the present specification.

The display device can display first visual information 610. In this case, the display device 100 can further display a first object 620-1. In this case, the first object may correspond to an object related to an operation interface. If the display device 100 detects a control input selecting the first object 620-1, the display device can display a first operation interface 630-1. In this case, the operation interface 630-1 may correspond to an interface used for simply executing operations included in the display device 100. More specifically, as an example, the operation interface 630-1 can include an operation object 640-1, a favorites object 640-2, a home button object 640-3 and a flex operation object 640-4. And, the operation interface 630-1 can include an object related to a different operation, by which the present specification may be non-limited. In this case, if the display device 100 detects a control input selecting the home button object 640-3, the display device 100 can execute an operation identical to an operation of a home button. And, as an example, if the display device 100 detects a control input selecting the flex operation object 640-4, the display device 100 can display an object related to a flex operation. In this case, as an example, the display device 100 can display a first operation object 660-1, a second operation object 660-2, a third operation object 660-3 and a fourth operation object 660-4. In this case, the aforementioned operation objects 660-1/660-2/660-3/660-4 may correspond to an object corresponding to an operation which is executed when the flexible display unit 110 is bending. If the display device 100 detects a control input selecting the first operation object 660-1, the display device 100 can execute a first operation. In this case, the first operation may correspond to an operation executed based on a first bending input, which is detected when the flexible display unit 110 is bending to the inside direction (direction of a body of a user) on the basis of a bending axis positioned at the center of the flexible display unit. And, the first operation may correspond to an operation executed based on a second bending input, which is detected by a combination of the first control input and the second control input in a state that the flexible display unit 110 is not bent. In particular, the first operation can be executed by one selected from the group consisting of the first bending input detected by bending of the flexible display unit 110, the second bending input detected by the combination of the first control input and the second control input and the control input selecting an object from a bend interface. In particular, the display device 100 can execute an identical operation in various ways.

And, referring to FIG. 6b, if a first control input is detected, the display device 100 can configure a first assistive axis 650-1. In this case, if the first assistive axis 650-1 is configured, the display device 100 can further display a second object 620-2. In this case, the second object 620-2 may correspond to an object related to a first bend interface 630-2. If the display device 100 detects a control input selecting the second object 620-2, the display device 100 can display the first bend interface 630-2. In this case, the first bend interface 630-2 can include an object identical to an object which is displayed based on the aforementioned flex operation object 640-4. In particular, when the first assistive axis 650-1 is configured, the display device 100 can directly move to a menu for a flex operation based on the control input selecting the second object 650-2.

And, referring to FIG. 6c, the display device 100 can display a different interface based on a position of an assistive axis. More specifically, the display device 100 can configure a second assistive axis 650-2 in an edge of the right side of the flexible display unit 110. In this case, the display device 100 can further display a third object 620-3. If the display device 100 detects a control input selecting the third object 620-3, the display device 100 can display a second bend interface 630-3. In this case, the second bend interface 630-3 can include a plurality of objects 680-1/680-2/680-3/680-4. In this case, a plurality of the objects 680-1/680-2/680-3/680-4 may correspond to an object corresponding to operations which are executed based on the aforementioned second assistive axis 650-2. The display device 100 selects one objects from a plurality of the objects 680-1/680-2/680-3/680-4 and can execute an operation corresponding to the selected object. In particular, the display device 100 can execute an operation based on a control input selecting an object.

Figure 7:
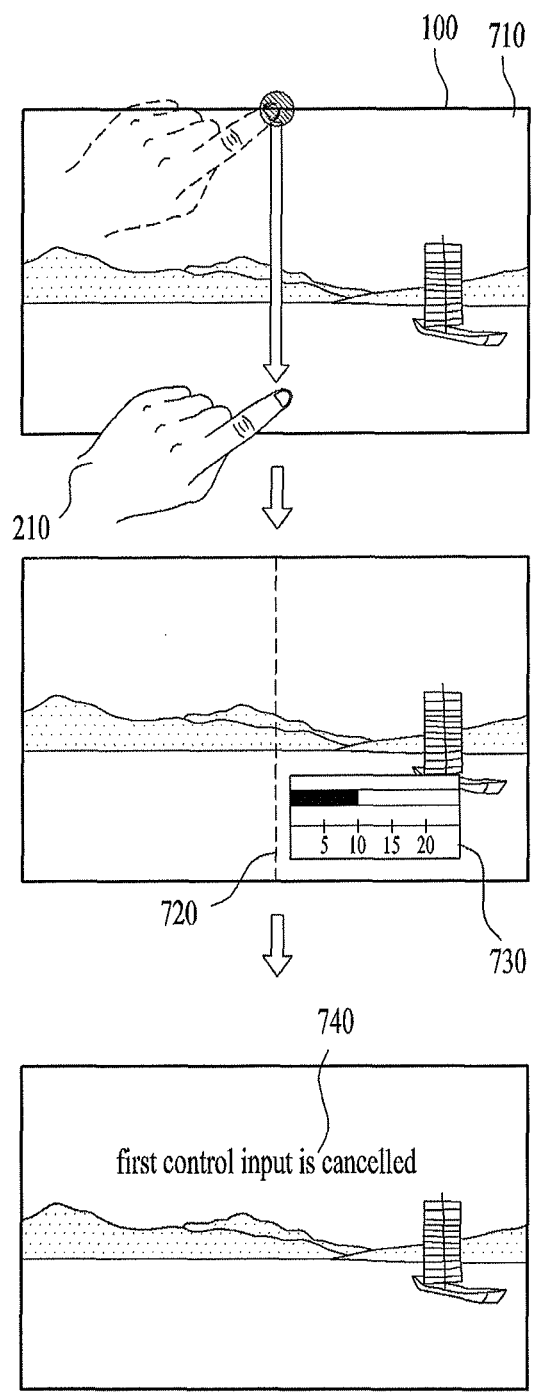
FIG. 7 is a diagram of a method for a display device to cancel a control input according to one embodiment of the present specification.

FIG. 7 is a diagram of a method for a display device to cancel a control input according to one embodiment of the present specification.

If a first control input is detected and a second control input is detected within a threshold time, the display device 100 can detect a second bending input. The display device 100 can execute an operation based on the second bending input. In this case, if the display device 100 detects the first control input and then the threshold time elapses, the display device 100 can cancel the first control input. And, the display device 100 can further display an indicator cancelling the first control input. And, as an example, the display device 100 detects the first control input and can execute an operation cancelling the first control input. In particular, the display device 100 can cancel the first control input before detecting the second bending input, by which the present specification may be non-limited.

And, the display device 100 detects the first control input and can display an indicator 730 indicating the elapse of the threshold time. By doing so, the display device 100 can provide time information for executing a second control input to a user.

Figure 8:
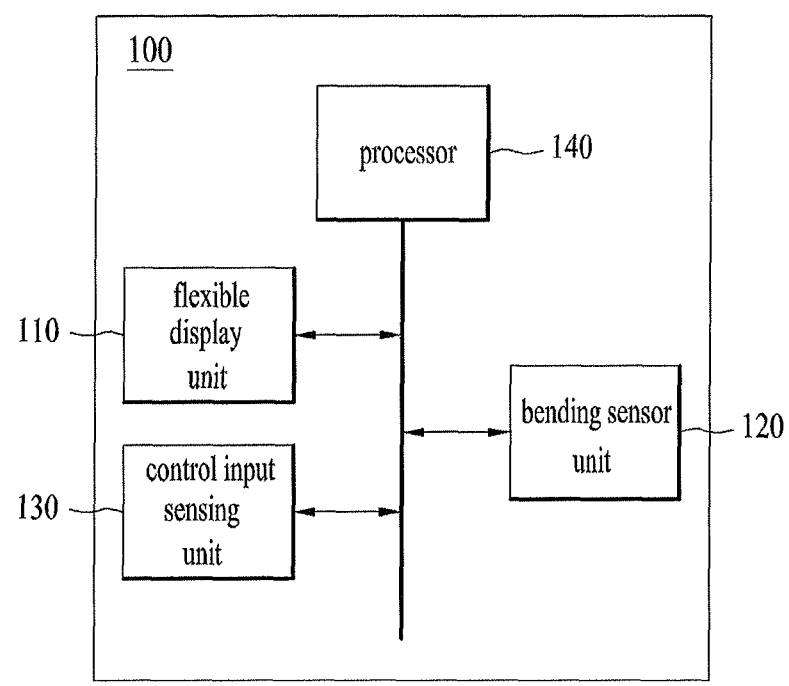
FIG. 8 is a block diagram for a display device according to one embodiment of the present specification.

FIG. 8 is a block diagram for a display device according to one embodiment of the present specification. The display device 100 can include a flexible display unit 110, a bending sensor unit 120, a control input sensing unit 130 and a processor 140.

The flexible display unit 110 may correspond to a display unit 110 capable of being bent or folded. As an example, the flexible display unit 110 may correspond to a display capable of bending or rolling a panel without detriment to the panel in a manner of using such a flexible material as plastic instead of a glass panel. In particular, the flexible display unit 110 may correspond to a flexible material. In this case, if the processor 140 detects that the flexible display unit 110 is bending, the processor 140 can execute an operation based on a bending direction on the basis of a bending axis. In this case, the bending axis may correspond to an axis generated in a direction in which the flexible display unit 110 is folded. More specifically, the bending axis can be configured based on a part of the flexible display unit 110 becoming a center of the bending. In particular, the display device 100 detects a bending axis configured by a user and can execute an operation based on the bending axis. And, the bending direction may correspond to a direction to which the flexible display unit 110 is bending. More specifically, the display device 100 can detect a direction to which the flexible display unit 110 is bent by a user. In this case, as an example, the bending direction may correspond to an inside direction or an outside direction of the flexible display unit 110. In particular, the bending direction may correspond to a direction to which a face of the flexible display unit 110 is folded among both faces of the flexible display unit. And, the bending direction may vary according to an internal position of the flexible display unit 110 based on the bending axis. In this case, as an example, the direction may correspond to a direction to which the flexible display unit is bent on the basis of the vertical passing through a center of the flexible display unit 110. In this case, the bending direction may correspond to an inside direction facing a user. And, the bending direction may correspond to an outside direction facing an opposite direction of the user. And, the bending direction may correspond to a direction to which the flexible display unit is bent on the basis of the horizontal passing through a center of the flexible display unit 110. In this case, the bending direction may correspond to an inside direction facing a user. And, the bending direction may correspond to an outside direction facing an opposite direction of the user. And, as an example, the bending axis may be configured by neither the vertical nor the horizontal direction. In this case, the bending direction may correspond to a direction to which the flexible display unit 110 is folded on the basis of the bending axis, by which the present specification may be non-limited.

And, the flexible display unit 110 can display visual information based on contents executed by the processor 140 or a control command of the processor 130. The visual information may correspond to information shown to a user via the flexible display unit 110. And, as an example, the flexible display unit 120 may correspond to a transparent flexible display unit as a see-through display.

And, as an example, the flexible display unit 110 can be implemented according to such a similar display technology as a LCD (liquid crystal display) technology, an OLED (organic light emitting diode) technology, an E-paper technology or the like to have a high level of flexibility. Since the flexible display unit 110 can be physically transformed, in case that a flexible display 170 is stored within a storing position, the flexible display can be stored in the internal storing position without increasing the total size of the display system 100.

And, as an example, the flexible display unit 110 may become a touch sensitive display screen equipped with a flexible display screen and a touch input recognition sensor preferably.

The bending sensor unit 120 detects bending of the flexible display unit 110 using a plurality of sensors installed in the display device 100 and can deliver a bending axis and a bending direction to the processor 140. The bending sensor unit 130 can include a plurality of sensing means. As one embodiment, a plurality of the sensing means can include such a sensing means as a gravity sensor, a terrestrial magnetism sensor, a motion sensor, a gyro sensor, an acceleration sensor, an inclination sensor, a brightness sensor, an altitude sensor, a smell sensor, a temperature sensor, a depth sensor, a pressure sensor, a bending sensor, an audio sensor, a video sensor, a GPS (global positioning system) sensor, a touch sensor and the like. The bending sensor unit 130 is a common name of the aforementioned various sensing means. The bending sensor unit senses various inputs and environment of the user and can deliver the sensed results to the device to make the device perform an operation according to the results. The aforementioned sensors can be included in the device as a separate element or can be included in the device in a manner of being integrated into at least one element.

The control input sensing unit 130 can deliver a user input or environment recognized by the device to the processor 140 using at least one sensor installed in the display device 100. More specifically, the control input sensing unit 130 can sense a control input of a user using at least one sensor installed in the display device 100. In this case, the at least one sensing means can include such various sensing means configured to sense a control input as a touch sensor, a fingerprint sensor, a motion sensor, a proximity sensor, an illumination sensor, a voice recognition sensor, a pressure sensor and the like. The control input sensing unit 130 is a common name of the aforementioned various sensing means. The aforementioned sensors can be included in the device as a separate element or can be included in the device in a manner of being integrated into at least one element. In particular, the control input sensing unit 130 may correspond to a unit sensing a control input of a user, by which the present specification may be non-limited.

As an example, a control input may correspond to a long-press touch input of a user, a short-press touch input, a slide touch input, a release touch input, a hovering input, a flicking touch input or the like as a touch input. And, the control input may correspond to various contact or non-contact inputs as a gesture input. And, the control input may correspond to an input inputted by an input device or an input inputted by voice or audio.

And, as an example, the control input sensing unit 130 may correspond to an element integrated with the flexible display unit 110. As an example, the flexible display unit 110 may correspond to a touch sensitive flexible display unit 110. And, as an example, the control input sensing unit 130 may correspond to an element integrated with the bending sensor unit 120. As an example, the display device 100 can include a plurality of sensors as a sensor hub. In this case, the sensor hub can include the aforementioned control input sensing unit 130 and the bending sensor unit 120. In particular, the aforementioned units can be configured by an integrated single unit.

The processor 140 may correspond to a unit configured to control at least one selected from the group consisting of the flexible display unit 110, the bending sensor unit 120 and the control input sensing unit 130. More specifically, the processor 140 displays visual information using the flexible display unit 110 and can provide the visual information to a user. And, the processor 140 can detect bending of the flexible display unit 110 using the bending sensor unit 120. In this case, the processor 140 can receive information on a bending direction and a bending axis related to the bending of the flexible display unit 110 from the bending sensor unit 120. And, the processor 140 can execute an operation by the bending based on the delivered information. And, the processor 140 can detect a control input using the control input sensing unit 130. In this case, as an example, the processor 150 can execute the aforementioned operation based on the control input. In particular, the processor 140 executes an operation by bending the flexible display unit and can also execute the identical operation using a separate control input. By doing so, a user can execute the operation using the separate control input instead of the bending of the flexible display unit.

And, the aforementioned sensors can be included in the display device 100 as a separate element or can be included in the device in a manner of being integrated into at least one element.

Figure 9:
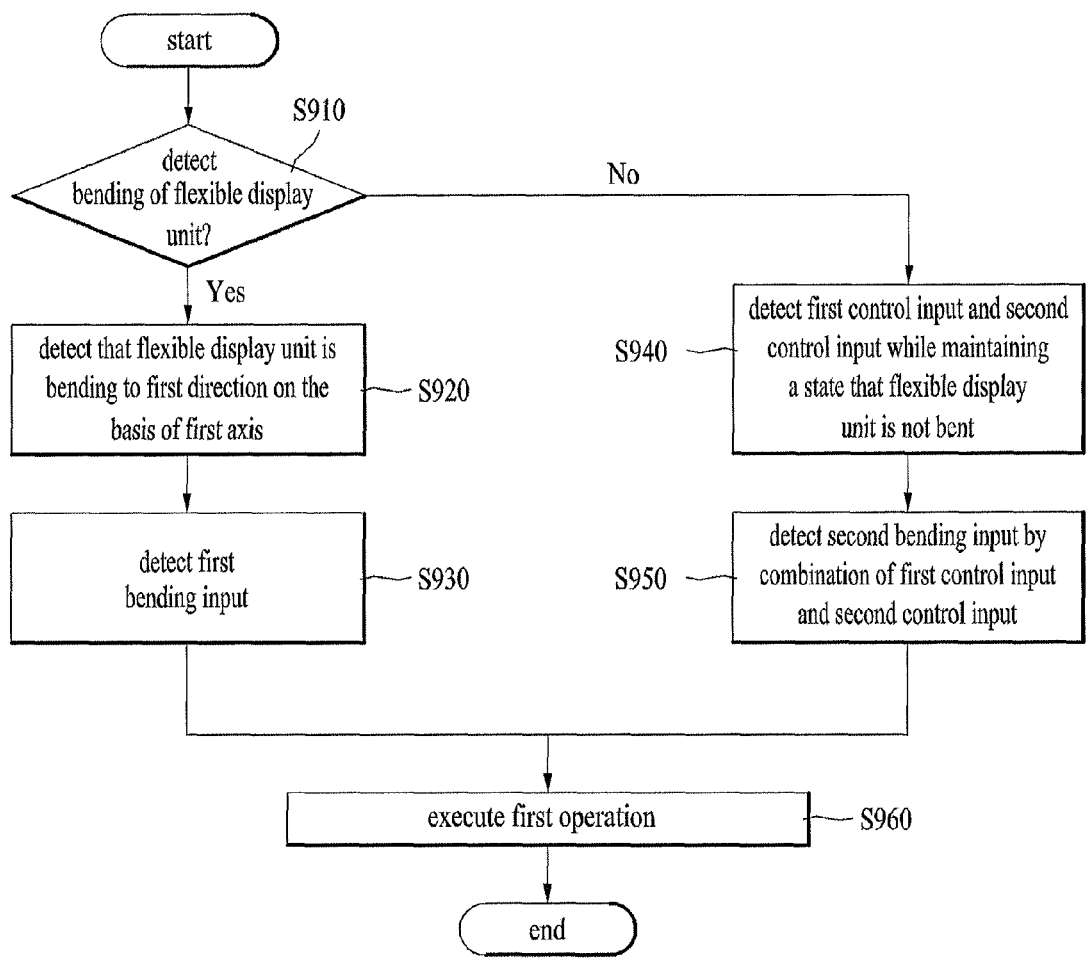
FIG. 9 is a flowchart for a method of controlling a display device according to one embodiment of the present specification.

FIG. 9 is a flowchart for a method of controlling a display device according to one embodiment of the present specification. The display device 100 can detect bending of the flexible display unit 110 [S910]. In this case, as mentioned in the foregoing description, the flexible display unit 110 can be implemented to have a high level of flexibility. And, the display device 100 detects the bending of the flexible display unit 110 using the bending sensor unit 120 and can deliver information on a bending axis and a bending direction to the processor 140 based on the bending.

Subsequently, in case that the flexible display unit 110 is bending, the display device 100 can detect that the flexible display unit is bending to a first direction on the basis of a first axis [S920]. As mentioned earlier in FIG. 1, the first axis may correspond to a bending axis generated by the bending of the flexible display unit 110. In this case, as an example, the first axis can be configured by a vertical axis or a horizontal axis passing by a center of the flexible display unit 110. And, as an example, a bending axis 210 can be configured by a line connecting a center of a top edge of the flexible display unit 110 and a center of a left edge of the flexible display unit as an axis. In particular, the first axis is configured when the flexible display unit 110 is bent, by which the present specification may be non-limited. And, the first direction may correspond to a direction to which the flexible display unit 110 is bending. As an example, the first direction may correspond to a direction to which the flexible display unit is folded by the front face. In particular, in case that a user is holding the display device 100, the bending direction may correspond to a direction facing a body of the user 210. And, as an example, the bending direction may correspond to a direction to which the flexible display unit is folded by the rear face. In particular, the first direction may correspond to a direction to which the flexible display unit is folded, by which the present specification may be non-limited.

Subsequently, the display device 100 can display a first bending input 930 [S930]. In this case, as mentioned earlier in FIG. 1, the first bending input 930 can be determined based on a bending axis and a bending direction. And, the first bending input 930 may correspond to an input which is detected based on physical transformation of the flexible display unit 110. The display device 100 can execute a first operation based on the first bending input. Regarding this, it shall be described later.

Subsequently, if the flexible display unit 110 is not bent, the display device 100 can detect a first control input and a second control input while maintaining a state that the flexible display unit 110 is not bent [S940]. In this case, as mentioned earlier in FIG. 2, the first control input may be an input corresponding to the bending axis and the second control input may be an input corresponding to the bending direction. As an example, the first control input and the second control input may correspond to at least one selected from the group consisting of a touch input, a gesture input, an input inputted by an input device and a voice input. And, as an example, the first control input and the second control input may correspond to at least one selected from the group consisting of a long-touch input, a short-touch input and a slide input. In particular, the first control input and the second control input may correspond to an input inputted by a user, by which the present specification may be non-limited. And, the display device 100 can configure an assistive axis based on the first control input. The display device 100 can detect the second control input based on the assistive axis. As an example, the second control input may correspond to a control input moving to a direction approaching or away from the assistive axis. And, as an example, the first control input and the second control input may correspond to a single control input.

Subsequently, the display device 100 can detect a second bending input by a combination of the first control input and the second control input. In this case, as mentioned earlier in FIG. 2, if the display device 100 detects the first control input and then detects the second control input within a threshold time, the display device 100 can detect it as the first control input and the second control input are combined with each other. In this case, the threshold time may correspond to a critical time and may have a prescribed error range. And, the threshold time can be configured by a user or a processor 140, by which the present specification may be non-limited. And, as mentioned earlier in FIG. 7, the display device 100 detects the first control input and can display an indicator 730 indicating the elapse of the threshold time.

Subsequently, the display device 100 can execute a first operation [S960]. In this case, as mentioned earlier in FIG. 1, the first operation may correspond to an operation executed based on the first bending input, which is detected when the flexible display unit 110 is bending on the basis of the bending axis. And, the first operation may correspond to an operation executed based on the second bending input, which is detected by the combination of the first control input and the second control input in the state that the flexible display unit 110 is not bent. In particular, the first operation can be executed by one selected from the group consisting of the first bending input inputted by the bending of the flexible display unit 110, the second bending input detected by the combination of the first control input and the second control input and a control input selecting an object from a bend interface. In particular, the display device 100 can execute an identical operation in various ways. And, as an example, as mentioned earlier in FIGS. 6a to 6c, the first operation can be executed based on a control input selecting an object.

Figure 10:
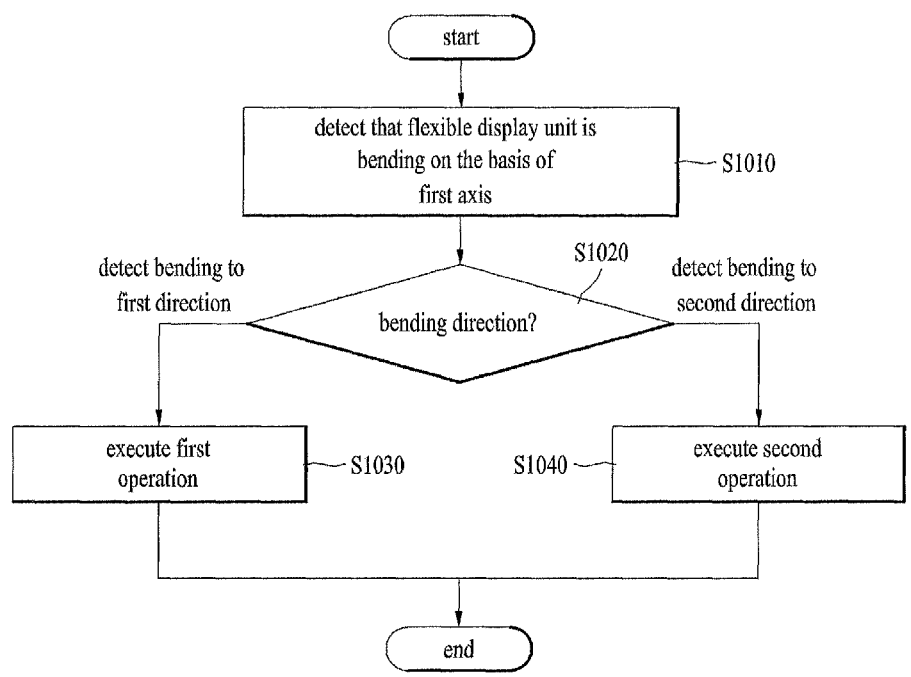
FIG. 10 is a flowchart for a method of controlling a display device according to one embodiment of the present specification.

FIG. 10 is a flowchart for a method of controlling a display device according to one embodiment of the present specification. The display device 100 can detect that the flexible display unit 110 is bending on the basis of a first axis [S1010]. In this case, as mentioned earlier in FIG. 8, the flexible display unit can be implemented to have a high level of flexibility. And, the display device 100 detects the bending of the flexibility unit 110 using the bending sensor unit 120 and can deliver information on the bending axis and the bending direction to the processor 140 based on the bending.

Subsequently, the display device 100 can detect the bending direction [S1020]. In this case, as mentioned earlier in FIG. 8, the display device 100 detects the bending axis and the bending direction of the flexible display unit 110 using the bending sensor unit 120 and can deliver information on the detected bending axis and the bending direction to the processor 140.

Subsequently, if the display device 100 detects that the flexible display unit 110 is bending to a first direction on the basis of a first axis, the display device can execute the first operation [S1030]. In this case, as mentioned earlier in FIGS. 3a to 3b, as an example, the display device 100 can detect that the flexible display unit 110 is bending to an inside direction on the basis of the first axis. In this case, the display device 100 can execute the first operation.

And, if the display device 100 detects that the flexible display unit 110 is bending to a second direction on the basis of the first axis, the display device can execute a second operation [S1040]. In this case, as mentioned earlier in FIGS. 3a to 3b, as an example, the display device 100 can detect that the flexible display unit 110 is bending to an outside direction on the basis of the first axis. In this case, the display device 100 can execute the second operation. In particular, the display device 100 can execute operations different from each other according to a bending direction based on the identical first axis.

FIG. 11 is a flowchart for a method of controlling a display device according to one embodiment of the present specification. The display device 100 can detect a first control input corresponding to a first axis while maintaining a state that the flexible display unit 110 is not bent [S1110]. In this case, as mentioned earlier in FIG. 1, the display device 100 can execute an operation corresponding to a physical transformation of the flexible display unit 110 without the physical transformation of the flexible display unit 110. And, as mentioned earlier in FIG. 2, the first control input may correspond to an input corresponding to a bending axis. As an example, the first control input may correspond to at least one selected from the group consisting of a touch input, a gesture input, an input inputted by an input device, and a voice input. And, as an example, the first control input may correspond to at least one selected from the group consisting of a long-touch input, a short-touch input and a slide input. In particular, the first control input may correspond to an input inputted by a user, by which the present specification may be non-limited.

Subsequently, the display device 100 can configure an assistive axis based on the first control input [S1120]. In this case, as mentioned earlier in FIG. 1, if the display device 100 detects the first control input, the display device can configure the assistive axis. In this case, the assistive axis may correspond to the aforementioned bending axis. More specifically, the bending axis can be configured when the flexible display unit 110 is bending. Since the display device 100 detects the first control input while maintaining the state that the flexible display unit 110 is not bent, the display device can make the first control input correspond to the bending axis. And, the display device 100 can detect a second control input based on the assistive axis.

Subsequently, the display device 100 can detect a moving direction of the second control input [S1130]. In this case, if the second control input moves to a direction approaching the assistive axis, the display device 100 can execute the first operation [S1140]. And, if the second control input moves to a direction away from the assistive axis, the display device 100 can execute a second operation [S1150]. In this case, as mentioned earlier in FIGS. 3a to 3d, the display device 100 can detect a first slide touch input and a second slide touch input as the second control input. In this case, if the first slide touch input and the second slide touch input move to a direction approaching the assistive axis 230, the display device 100 can execute the first operation. And, if the display device 100 detects that the flexible display unit 110 is bending to an inside direction on the basis of the first axis, the display device can execute the first operation. In particular, the direction approaching the assistive axis may correspond to the direction of the flexible display unit 110, which is bending to the inside direction.

Similar to this, the display device 100 can detect the first slide touch input and the second slide touch input as the second control input in the state that the flexible display unit is not bent. If the first slide touch input and the second slide touch input move to a direction away from the assistive axis 230, the display device 100 can execute the second operation. And, if the display device 100 detects that the flexible display unit 110 is bending to an outside direction on the basis of the first axis 210, the display device can execute the second operation. In particular, the direction away from the assistive axis 230 may correspond to the direction of the flexible display unit 110, which is bending to the outside direction. By doing so, the display device 100 can execute an operation based on bending of the flexible display unit while maintaining the state that the flexible display unit 110 is not bent.

For clarity of explanation, each diagram is explained in a manner of being divided. Yet, it is possible to design a new embodiment to implement the new embodiment by combining the embodiments, which are described in each of the diagrams. And, according to the necessity of those skilled in the art, designing a recording media readable by the computer, which has recorded a program for executing the previously explained embodiments, also belongs to a scope of a right.

A display device 100 according to the present specification and a method of controlling therefor may not limitedly apply to the composition and method of the aforementioned embodiments. The aforementioned embodiments may be configured in a manner of being selectively combined the whole of the embodiments or a part of the embodiments to achieve various modifications.

Meanwhile, a display device 100 according to the present specification and a method of controlling therefor can be implemented with a code readable by a processor in a recording media readable by the processor, which is equipped in a network device. The recording media readable by the processor may include all kinds of recording devices for storing data capable of being read by the processor. The examples of the recording media readable by the processor may include a ROM, a RAM, a magnetic tape, a floppy disc, an optical data storing device and the like. And, implementing in a form of a carrier wave such as a transmission via the internet and the like is also included. And, since the recording media readable by the processor are distributed to the computers connected by a network, codes readable by the processor can be stored and executed in a manner of being distributed.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

And, both an apparatus invention and a method invention are explained in the present specification and the explanation on both of the inventions can be complementarily applied, if necessary.

What is claimed is:

1. A display device, comprising:
   a flexible display unit configured to display visual information;
   a bending sensor unit;
   a control input sensing unit; and
   a processor configured to
   execute one of a first operation in response to a first input, the first operation in response to a second input and the first operation in response to a third input,
   wherein the first input is detected, by the bending sensor unit, when the flexible display unit is bending to a first direction on the basis of a first axis,
   wherein the second input is detected by a combination of a first control input and a second control input while maintaining a state that the flexible display unit is not bent,
   wherein the first control input corresponds to the first axis and the second control input corresponds to the first direction, and
   wherein the third input is detected based on selection of an operation object included in an operation interface displayed on the flexible display unit, and the operation interface is provided by selecting an object displayed on the flexible display unit.

2. The display device of claim 1, wherein the first control input corresponds to a control input moving from a first position to a second position of the flexible display unit and,
   wherein the processor is further configured to set an assistive axis corresponding to the first axis based on the first position and the second position.

3. The display device of claim 2, wherein the processor is further configured to detect the second control input based on the assistive axis.

4. The display device of claim 3, wherein the second control input is detected by a combination of a first slide touch input and a second slide touch input,
   wherein the first slide touch input corresponds to an input detected in a first area of the flexible display unit and the second slide touch input corresponds to an input detected in a second area of the flexible display unit, and
   wherein the first area and the second area are distinguished from each other by the assistive axis.

5. The display device of claim 4, wherein the processor is further configured to:
   set a first reference direction and a second reference direction corresponding to the second control input based on the assistive axis, and
   if it is detected that the first slide touch input moves to the first reference direction and the second slide touch input moves to the second reference direction, detect that the first slide touch input and the second slide touch input are combined with each other.

6. The display device of claim 2, wherein the processor is further configured to:
   display a direction indicator for the second control input when the assistive axis is set,
   wherein the direction indicator is configured to guide a moving direction of the second control input.

7. The display device of claim 2, wherein the processor is further configured to:
   display a bend interface for the second control input when the assistive axis is set,
   wherein the bend interface comprises an operation object, and
   execute a second operation when a control input selecting the operation object contained in the bend interface is detected in a state that the second control input is not detected.

8. The display device of claim 1, wherein the processor is further configured to:
   if the first control input is detected and then the second control input is detected within a threshold time, detect that the first control input and the second control input are combined with each other.

9. The display device of claim 1, wherein the bending sensor unit is further configured to detect a third bending input,
   wherein the third bending input is detected when the flexible display unit is bending to the first direction on the basis of a second axis, and
   wherein the processor is further configured to execute a third operation based on the third bending input.

10. The display device of claim 9, wherein the processor is further configured to execute the third operation when a fourth bending input is detected while maintaining the state that the flexible display unit is not bent.

11. The display device of claim 10, wherein the fourth bending input is detected by a combination of the second control input and a third control input, and
    wherein the third control input corresponds to the second axis.

12. The display device of claim 11, wherein the processor is further configured to:
    set a first assistive axis corresponding to the first axis based on the first control input moving from a first position to a second position of the flexible display unit, and set a second assistive axis corresponding to the second axis based on the third control input moving from a third position to a fourth position of the flexible display unit, wherein if the second control input is detected in a state that the first assistive axis is set, execute the second operation, and if the second control input is detected in a state that the second assistive axis is set, execute the third operation.

13. The display device of claim 1, wherein the bending sensor unit is further configured to detect a third bending input, wherein the third bending input is detected when the flexible display unit is bending to a second direction on the basis of the first axis, and wherein the processor is further configured to execute a third operation based on the third bending input.

14. The display device of claim 13, wherein the processor is further configured to execute the third operation when a fourth bending input is detected while maintaining the state that the flexible display unit is not bent.

15. The display device of claim 14, wherein the processor is further configured to detect the fourth bending input by a combination of the first control input and a third control input, and wherein the third control input corresponds to the second direction.

16. The display device of claim 15, wherein the processor is further configured to:

set an assistive axis corresponding to the first axis based on the first control input, execute the second operation when the second control input is detected in a state that the assistive axis is set, and execute the third operation when the third control input is detected in a state that the assistive axis is set, wherein the second control input corresponds to a slide input moving in a direction away from the assistive axis and the third control input corresponds to a slide input moving in a direction approaching the assistive axis.

17. The display device of claim 1, wherein the first control input and the second control input correspond to at least one selected from the group consisting of a touch input, a gesture input, a voice input and an input inputted by an input device.

18. A method of controlling a display device including a flexible display unit and a bending sensor unit, the method comprising the step of:

executing one of a first operation in response to a first input, the first operation in response to a second input and the first operation in response to a third input, a third input, wherein the first input is detected, by the bending sensor unit, when the flexible display unit is bending to a first direction on the basis of a first axis, wherein the second input is detected by a combination of a first control input and a second control input while maintaining a state that the flexible display unit is not bent, wherein the first control input corresponds to the first axis and the second control input corresponds to the first direction, and wherein the third input is detected based on selection of an operation object included in an operation interface displayed on the flexible display unit, wherein the operation interface is provided by selecting an object displayed on the flexible display unit.

* * * * *